United States Patent
Yan et al.

(10) Patent No.: US 10,477,254 B1
(45) Date of Patent: Nov. 12, 2019

(54) SYSTEMS AND METHODS FOR PROVIDING MEDIA CONTENT RELATED TO A DETECTED AMBIGUOUS SITUATION DURING A SPORTING EVENT

(71) Applicant: Rovi Guides, Inc., San Jose, CA (US)

(72) Inventors: Thomas Kang-Po Yan, Lexington, MA (US); Hong-Qi Jia, Dedham, MA (US); Peter Boonstra, Arlington, MA (US); Kerui Chen, Somerville, MA (US)

(73) Assignee: ROVI GUIDES, INC., San Jose, CA (US)

( * ) Notice: Subject to any disclaimer, the term of this patent is extended or adjusted under 35 U.S.C. 154(b) by 0 days.

(21) Appl. No.: 16/028,038

(22) Filed: Jul. 5, 2018

(51) Int. Cl.
| | |
|---|---|
| *H04N 21/234* | (2011.01) |
| *H04N 21/235* | (2011.01) |
| *H04N 21/233* | (2011.01) |
| *H04N 21/266* | (2011.01) |
| *H04N 21/2187* | (2011.01) |
| *G10L 15/22* | (2006.01) |
| *G10L 15/08* | (2006.01) |

(52) U.S. Cl.
CPC ....... *H04N 21/23424* (2013.01); *G10L 15/08* (2013.01); *G10L 15/22* (2013.01); *H04N 21/2187* (2013.01); *H04N 21/233* (2013.01); *H04N 21/2353* (2013.01); *H04N 21/26603* (2013.01); *G10L 2015/088* (2013.01)

(58) Field of Classification Search
CPC ........... H04N 21/2353; H04N 21/2187; H04N 21/233; H04N 21/23424; H04N 21/235; H04N 21/435; H04N 21/439; H04N 21/4394; H04N 21/434; H04N 21/4345
See application file for complete search history.

(56) References Cited

U.S. PATENT DOCUMENTS

| | | |
|---|---|---|
| 6,239,794 B1 | 5/2001 | Yuen |
| 6,564,378 B1 | 5/2003 | Satterfield |
| 7,165,098 B1 | 1/2007 | Boyer |
| 7,761,892 B2 | 7/2010 | Ellis |
| 8,046,801 B2 | 10/2011 | Ellis |
| 8,647,206 B1 | 2/2014 | Gottlieb |
| 2002/0174430 A1 | 11/2002 | Ellis |
| 2005/0251827 A1 | 11/2005 | Ellis |
| 2008/0208589 A1 | 8/2008 | Cross |
| 2010/0153885 A1 | 6/2010 | Yates |

(Continued)

*Primary Examiner* — Hsiungfei Peng
*Assistant Examiner* — Fred Peng
(74) *Attorney, Agent, or Firm* — Haley Guiliano LLP

(57) ABSTRACT

Systems and methods are disclosed herein for providing media clips that depict referee's decisions that are similar to a decision made in a sporting event being currently consumed by the user. A media guidance application may be configured to perform the actions described herein. Specifically, the media guidance application may determine, that an officiator of the sporting event stopped play for a specific situation. In response, the media guidance application may extract metadata that corresponds to the specific situation and compare the metadata that corresponds to the specific situation with metadata for similar situations that occurred in other similar sporting events. The media guidance application may identify a similar situation or event that occurred in another similar sporting event (e.g., the same sport) and generate for display video of the similar situation.

14 Claims, 14 Drawing Sheets

(56) References Cited

U.S. PATENT DOCUMENTS

| | | | |
|---|---|---|---|
| 2015/0128162 A1* | 5/2015 | Ionescu | G06Q 30/00 725/14 |
| 2015/0382079 A1 | 12/2015 | Lister | |
| 2016/0044226 A1 | 2/2016 | Williams | |
| 2016/0117739 A1* | 4/2016 | Patel | G06Q 30/0277 705/14.73 |
| 2017/0214960 A1 | 7/2017 | Kim | |
| 2018/0189971 A1* | 7/2018 | Hildreth | G06T 7/70 |
| 2018/0213286 A1 | 7/2018 | Roman | |

* cited by examiner

SYSTEMS AND METHODS FOR PROVIDING MEDIA CONTENT RELATED TO A DETECTED AMBIGUOUS SITUATION DURING A SPORTING EVENT

BACKGROUND

When users consume sporting events, contentious moments come up during these sporting events. For example, in a National Football League (NFL) game a player may catch a pass, but he may be close to an out-of-bounds line or may step out of bounds, thereby, causing a contentious moment where a referee has to make a decision. In another example, in a National Hockey League (NHL) game, there may be an ambiguity as to whether a puck has crossed the goal line for a goal or not before the goalie covered it. In this instance, the referee also has to make a decision on the play. In many instances users want to know whether the referee's decision is consistent with what has been decided in prior instances, and whether the decision is consistent with the rules based on how the rules have been interpreted by other referees. However, currently available systems do not provide a way to automatically show users whether past decisions are consistent with a current decision.

SUMMARY

Therefore, systems and methods are disclosed herein for providing media clips that depict other referees' decisions that are similar to a decision made in a sporting event currently being consumed by the user. A media guidance application may be configured to perform the actions described herein. Specifically, the media guidance application may determine, that an officiator of the sporting event stopped play for a specific situation. In response, the media guidance application may extract metadata that corresponds to the specific situation and compare the metadata that corresponds to the specific situation with metadata for similar situations that have occurred in other similar sporting events. The media guidance application may identify a similar situation or event that occurred in another similar sporting event (e.g., the same sport) and generate for display video of the similar situation.

For example, in an NFL game a referee may have stopped the game because a player caught the ball out of bounds. The media guidance application may analyze the situation and determine that the ambiguity concerns whether the player was in bounds or out of bounds when the ball was caught. In response, the media guidance application may find (based on comparing metadata) other incidents (e.g., from other games) where there was a similar decision and show the viewer videos of those incidents, for example, to let the user compare the current situation with the past decisions and the associated video.

In some aspects, the media guidance application may perform the following actions when providing media clips that depict referees' decisions that are similar to a decision made in a sporting event currently being consumed by the user. The media guidance application may detect a stoppage of play. Specifically, the media guidance application may determine, during playback of a sporting event and based on content of a sporting event, that a stoppage of play has occurred. For example, in an NFL game, the media guidance application may determine that the referee blew his whistle thereby stopping the game.

In response to determining that the stoppage of play has occurred, the media guidance application may access the different media streams of the media asset and determine whether the stoppage of play was caused by a game official. Specifically, in response to determining that the stoppage of play has occurred the media guidance application may perform the following actions. The media guidance application may access one or more of an audio stream of the sporting event, a video stream of the sporting event, and a subtitle stream of the sporting event, and determine, based on one or more of the video stream, the audio stream, and the subtitle stream, whether the stoppage of play resulted from an ambiguous determination by an officiator of the sporting event.

For example, the media guidance application may analyze the subtitles and/or audio of the NHL game to determine whether the commentators are talking about a specific reason (e.g., based on keywords) for the stoppage of the game and whether there is some ambiguity about the referee's decision.

The media guidance application may extract metadata from the media when it determines that the stoppage of play was caused by a game official. Specifically, in response to determining that the stoppage of play resulted from the ambiguous determination, the media guidance application may extract, from one or more of the audio stream, video stream, and subtitle stream of the sporting event, metadata that corresponds to the ambiguous determination by the officiator of the sporting event. For example, the media guidance application may extract words or phrases from the subtitles and the audio. These words may include "puck over the line," "no goal," "stopped in time," and other suitable words and phrases. The media guidance application may transmit a request for metadata entries, each describing content of a corresponding historical ambiguous event, where the request includes at least a portion of the metadata that corresponds to the ambiguous determination. For example, the media guidance application may transmit the phrases mentioned above in order to locate entries that describe similar situations in other games.

The media guidance application may receive, in response to the request, one or more historical ambiguous events that corresponds to the segment. For example, the media guidance application may receive entries associated with other hockey games where a similar situation has occurred (e.g., the goalie may or may not have covered the puck before it went into the goal). The media guidance application may generate for display video of the historical ambiguous events. For example, the media guidance application may generate for display a video indicating that the whole puck needs to cross the whole line before a goal is called.

In some embodiments, the media guidance application may perform the following actions when determining, during the playback of a sporting event and based on the content of the sporting event, that a stoppage of play has occurred. The media guidance application may monitor the video stream of the sporting event and determine, based on the monitoring, that the officiator of the sporting event is performing a pre-defined action. In response to determining that the officiator of the sporting event is performing the pre-defined action, the media guidance application may determine that a stoppage of play has occurred. For example, if the media guidance application determines, based on the video of the hockey game, that the referee of the hockey game, moves his hands in a specific motion (the pre-defined action), the media guidance application may determine that a stoppage of play has occurred.

In some embodiments, the media guidance application may, when determining, during the playback of a sporting event and based on the content of the sporting event, that a stoppage of play has occurred, perform the following actions. The media guidance application may monitor the subtitle stream for keywords associated with a stoppage of play and determine, based on keywords within the subtitle stream that the officiator of the sporting event caused a stoppage of play. For example, the subtitle stream may include a phrase "The referee has stopped the game" or "A whistle has been blown." The media guidance application may detect those phrases/words and determine that a stoppage of play has occurred.

In some embodiments, the media guidance application may, when determining that the officiator of the sporting event is performing a pre-defined action, perform the following actions. The media guidance application may monitor the video stream of the sporting event and compare, within a plurality of frames of the video stream of the sporting event, one or more of a movement and position of the officiator of the sporting event with a plurality of database entries, each including one or more of a predetermined movement and position of the officiator. The media guidance application may determine, based on comparing the one or more of movements and positions of the officiator of the sporting event with the plurality of database entries, that the officiator of the sporting event is performing a pre-defined action. For example, the media guidance application may determine that the referee of the hockey game is making a specific gesture with his arms (e.g., a sweeping motion across the body, palms down) to signal that a goal has not been scored.

In some embodiments, the media guidance application may, when determining, whether the stoppage of play resulted from the ambiguous determination by the officiator of the sporting event perform the following actions. The media guidance application may monitor one or more of the subtitle stream of the sporting event and the audio stream of the sporting event and compare a plurality of words within one or more of the subtitle stream of the sporting event and the audio stream of the sporting event with keywords associated with an ambiguous determination. The media guidance application may determine, based on comparing the plurality of words within one or more of the subtitle stream of the sporting event and the audio stream of the sporting event with the keywords associated with the ambiguous determination, that the ambiguous determination by the officiator of the sporting event has occurred. For example, the media guidance application may be monitoring a hockey game. The media guidance application may detect the phrase "The referee waives off the goal." Based on that phrase, the media guidance application may determine that the game was stopped due to an ambiguous determination (i.e., a determination of no goal).

In some embodiments, the media guidance application may, when extracting metadata that corresponds to the ambiguous determination by an officiator of the sporting event, perform the following actions. The media guidance application may analyze one or more of the subtitle stream and the audio stream following the stoppage of play and extract, based on analysis of one or more of the subtitle stream and the audio stream, one or more keywords associated with the ambiguous determination. For example, the media guidance application may detect the stoppage of play and the phrase "The referee blew the whistle signaling that there was no goal." The media guidance application may extract "blew whistle" and "no goal."

In some embodiments, the media guidance application may, when analyzing one or more of the subtitle stream and the audio stream following the stoppage of play, perform the following actions. The media guidance application may scan the video stream for a time when the sporting event resumed after the stoppage of play and analyze one or more of the subtitle stream and the audio stream between a time the stoppage of the sporting event occurred and the time when the sporting event resumed. For example, if, in the hockey game, the referee stopped the game indicating no goal, the media guidance application may mark that as a start time for storing metadata, and when the game resumes, the media guidance application may mark that time as the stop time for storing metadata. In some embodiments, this time may include any video review process initiated to get the correct decision.

The media guidance application may, when extracting one or more keywords associated with the ambiguous determination, perform the following actions. The media guidance application may extract, from one or more of the audio stream and subtitle stream, a plurality of words detected following the stoppage of play, and compare each word of the plurality of words with each of a plurality of keywords known to be associated with ambiguous determinations. The media guidance application may store those words of the plurality of words that match one or more of the plurality of keywords known to be associated with the ambiguous determinations. For example, if in the hockey game, the referee stopped the game indicating no goal, the media guidance application may extract between the start time and the stop time the phrase spoken by a commentator, "No goal has been indicated." However, other phrases after the start of action may not be analyzed by the media guidance application.

In some embodiments, the media guidance application may select one of several received similar game situations to present to the user based on the amount of metadata matching between the current situation and the historical one. Specifically, the media guidance application may determine that a plurality of historical ambiguous events was received in response to the request, and select the historical ambiguous event of the plurality of ambiguous events based on a number of an amount of extracted keywords matching a number of keywords associated with the historical ambiguous event. For example, if six keywords match for one event and ten for another, the event with ten matching keywords is chosen to be presented.

In some embodiments, the media guidance application may present, to the user, multiple historical events so the user can choose one to view. Specifically, the media guidance application may generate for display one or more indications for one or more historical ambiguous events, and in response to a user selection of an one or more indications, generate for simultaneous display a historical ambiguous event corresponding to the selected indication and a media segment associated with the ambiguous determination. For example, the media guidance application may generate for display a grid of different historical events for the user and enable the user to choose the one desired.

In some aspects, the media guidance application may provide similar media content based on user utterances responsive to ambiguous determinations at sporting events. The media guidance application may detect a user utterance (e.g., a user says: "I can't believe that the referee called the player out of bounds"). The media guidance application may identify the situation (e.g., the play in a football game) to which the user was referring. The media guidance application may compare metadata of the identified situation/segment (e.g., the play) with metadata of a plurality of historical ambiguous events (e.g., other similar plays), and determine, based on the comparison, a historical ambiguous event (e.g., a similar play) that corresponds to the segment/situation. The media guidance application may generate for display video including the historical ambiguous event (e.g., a similar play) that corresponds to the segment.

In some embodiments, the media guidance application may provide similar media content based on user utterances responsive to ambiguous determinations at sporting events using the following actions. The media guidance application may detect that a user said something about a sporting event that the user is consuming. Specifically, the media guidance application may detect, during playback of the sporting event, a user utterance that references an ambiguous determination by an officiator of a sporting event. For example, the media guidance application may detect that the user said, "I cannot believe the referee called the catch out of bounds" during a football game.

The media guidance application may identify the play to which the user was referring. Specifically, the media guidance application may determine a segment of the sporting event that corresponds to the ambiguous determination. For example, the media guidance application may identify a play of the football game to which the user was referring in the user utterance.

The media guidance application may extract audio data and subtitle data from the determined segment. Specifically, the media guidance application may extract, from one or more of the audio stream, video stream, and subtitle stream of the sporting event, metadata that corresponds to the segment. For example, the media guidance application may extract the commentator's discussion and the referee's explanation of the decision with phrases like "no catch, player over the line," from the audio and/or subtitle streams.

The media guidance application may transmit a request for similar plays to present to the user. Specifically, the media guidance application may transmit a request for metadata entries, each describing content of a corresponding historical ambiguous event, where the request includes at least a portion of the metadata that corresponds to the segment. For example, the media guidance application may transmit a query for any plays and include keywords or key phrases such as "no catch," "player out of bounds," and other suitable words/phrases.

The media guidance application may receive, in response, similar plays to present to the user. Specifically, the media guidance application may receive, in response to the request, one or more historical ambiguous events that correspond to the segment. For example, the media guidance application may receive videos of an American football game where a player catches the ball but is ruled out of bounds because one of his feet may not have been inside an out-of-bounds line. The media guidance application may generate for display video including a historical ambiguous event of one or more historical ambiguous events. For example, the media guidance application may generate for display one of the received videos.

In some embodiments, the media guidance application may, when detecting the user utterance that references the ambiguous determination by an officiator of a sporting event, perform the following actions. The media guidance application may detect, using a microphone, the user utterance. For example, the media guidance application may detect the user saying, "I cannot believe the referee did not rule this play a catch." The media guidance application may transform the user utterance into a plurality of keywords. For example, the media guidance application may use a speech recognition algorithm to transform the utterance into keywords and/or phrases. The media guidance application may try to locate similar plays. Specifically, the media guidance application may compare the plurality of keywords with words that are associated with ambiguous determinations associated with the sporting event. For example, the media guidance application may compare the extracted words to keywords indicating close/questionable decisions in football games. If the keywords match, the media guidance application may determine that the user's utterance refers to a situation in the game. Specifically, the media guidance application may, in response to determining, based on the comparing, that a plurality of keywords matches the words that are associated with the ambiguous determinations associated with the sporting event, determine that the user utterance references the ambiguous determination by the officiator of the sporting event. For example, if words/phrases like "no catch," "so close," or "close call" are matched, the media guidance application may determine that the user was referring to a situation in the game.

In some embodiments, the media guidance application may, when determining the segment of the sporting event that corresponds to the ambiguous determination, take the following actions. The media guidance application may identify a time within the sporting event when the user utterance was detected. Specifically, the media guidance application may determine a time within the sporting event that corresponds to a time of the user utterance. For example, the media guidance application may determine that the user utterance was detected when 55 minutes had elapsed in the media asset (i.e., the football game). The media guidance application may retrieve a predetermined time for the segment. Specifically, the media guidance application may retrieve a segment interval associated with the ambiguous determination. For example, the media guidance application may retrieve a value of 30 seconds, 60 seconds, or another suitable value. The media guidance application may store the segment interval based on the retrieved value. Specifically, the media guidance application may determine the segment of the sporting event based on the segment interval. For example, the media guidance application may generate a segment interval of 15 seconds prior to the utterance and 15 seconds after the utterance.

In some embodiments, the media guidance application may determine the segment of the sporting event related to the user utterance by scanning backwards until the referee is seen (i.e., the referee making the determination). The media guidance application may determine a time within the sporting event that corresponds to a time of the user utterance. For example, the media guidance application may determine that the user utterance was detected at 35:10 of the football game (i.e., the sporting event). The media guidance application may scan the sporting event backwards from the time within the sporting event that corresponds to the time of the user utterance until the officiator of the sporting event is in focus. For example, the media guidance application may scan until the referee is in focus (e.g., the referee is the biggest object on the screen). The media guidance application may set a time within the sporting event when the officiator of the sporting event is in focus as an end time of the segment. For example, the referee is shown in a football game to make a call on the play at 34:55 of the game. The media guidance application may store that time as the end time of the segment. The media guidance application may continue to scan backwards until the referee is in focus again. Specifically, the media guidance application may scan the sporting event backwards from the time within the sporting event that the officiator of the sporting event is in focus until a next time the officiator of the sporting event is in focus, and set the next time the officiator of the sporting event is in focus as a start time of the segment. For example, if the referee is in focus at 33:55 of the game, the media guidance application may store that time as the start of the segment.

In some embodiments, the media guidance application may determine whether the user's utterance references a situation in a sporting event by analyzing subtitle and audio feeds to determine if the user utterance is related to any data (e.g., words within those feeds). Specifically, the media guidance application may access one or more of the audio stream and the subtitle stream of the sporting event and determine a time within one or more of the audio stream and the subtitle stream corresponding to a time of the user utterance. For example, the media guidance application may determine that the user utterance occurred at 35:10 of a football game and access a portion of the audio stream and/or subtitle at that time mark. The media guidance application may compare one or more of subtitle data and audio data with data of the user utterance. For example, the media guidance application may compare words from the user utterance with words in the subtitles and audio a number of minutes or seconds (e.g., two minutes) prior to the user utterance. The media guidance application may, in response to determining, based on the comparing, that one or more of the subtitle data and the audio data matches the data of the utterance, detect the user utterance that references the ambiguous determination by the officiator of the sporting event. For example, if the user utterance includes the words, "I can't believe the referee called him out of bounds," and the subtitle or audio data includes the words "out of bounds," the media guidance application may determine that the user utterance is related to the sporting event.

In some embodiments, the media guidance application may, when extracting metadata that corresponds to the segment, perform the following actions. The media guidance application may analyze one or more of the subtitle stream and the audio stream of the segment and extract, based on the analyzing from the one or more of the subtitle stream and the audio stream, one or more keywords associated with the segment. For example, the media guidance application may detect, the stoppage of play and the phrase "The referee blew the whistle signaling that he was out of bounds." The media guidance application may extract "blew the whistle" and "out of bounds."

In some embodiments, the media guidance application may, when analyzing one or more of the subtitle stream and the audio stream of the segment, perform the following actions. The media guidance application may scan the video stream for a time when the sporting event resumed after the user utterance and analyze the one or more of the subtitle stream and the audio stream between a time of the user utterance and the time when the sporting event resumed. For example, if the referee stopped a football the game because a player was out of bounds when he caught the ball, the media guidance application may mark that as a start time for storing metadata and when the game resumes (e.g., when the next play starts), the media guidance application may mark that time as the stop time for storing metadata. In some embodiments, this time may include any video review process initiated to get the correct decision.

The media guidance application may, when extracting the one or more keywords associated with the segment, perform the following actions. The media guidance application may extract, from one or more of the audio stream and subtitle stream, a plurality of words detected following the stoppage of play, and compare each word of the plurality of words with each of a plurality of keywords known to be associated with ambiguous determinations. The media guidance application may store those words of the plurality of words that match one or more of the plurality of keywords known to be associated with the segment. For example, if in a football game, the referee stopped the game indicating no catch because the player went out of bounds, the media guidance application may extract between the start time and the stop time the phrase spoken by a commentator "No catch, out of bounds."

In some embodiments, the media guidance application may select one of several received similar game situations to present to the user based on the amount of metadata matching between the current situation and the historical one. Specifically, the media guidance application may determine that a plurality of historical ambiguous events was received in response to the request, and select the historical ambiguous event of the plurality of ambiguous events based on a number of an amount of extracted keywords matching a number of keywords associated with the ambiguous determination. For example, if six keywords match for one event and ten for another, the event with ten matching keywords is chosen to be presented.

In some embodiments, the media guidance application may present, to the user, multiple historical events so the user can choose one to view. Specifically, the media guidance application may generate for display one or more indications for the one or more historical ambiguous events, and in response to a user selection of an indication of the one or more indications, generate for simultaneous display a historical ambiguous event corresponding to the selected indication and a media segment associated with the ambiguous determination. For example, the media guidance application may generate for display a grid of different historical events for the user and enable the user to choose the one desired.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
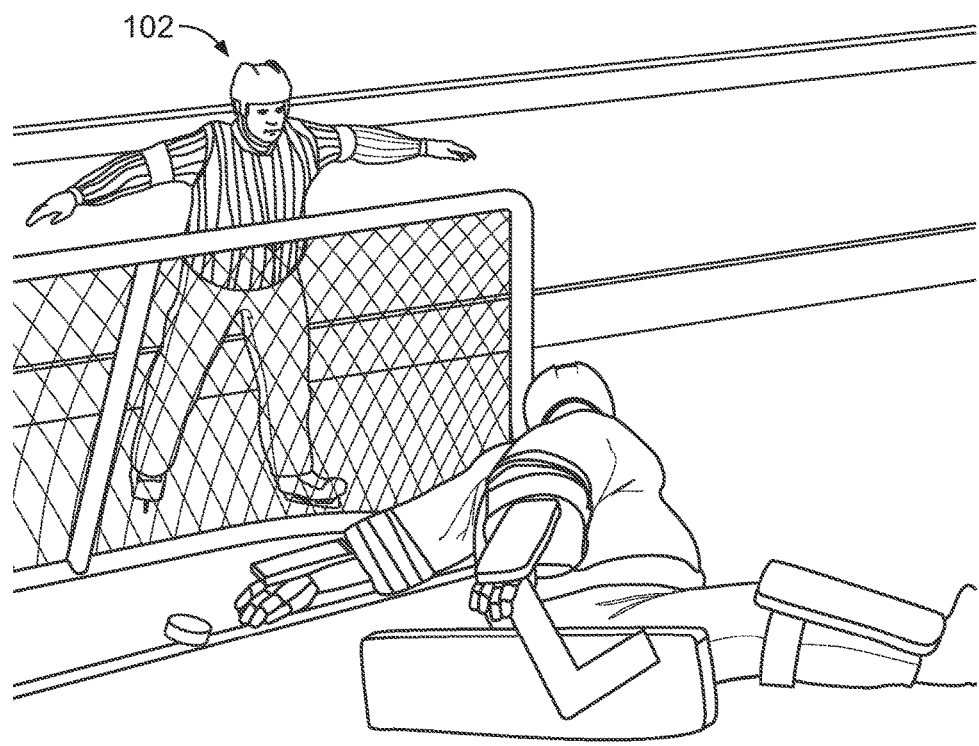
FIG. 1 shows an illustrative example of a display screen showing an ambiguous determination by an officiator of a sporting event, in accordance with some embodiments of the disclosure.

Systems and methods are disclosed herein for providing media clips that depict referees' decisions that are similar to a decision made in a sporting currently being currently consumed by the user. Specifically, a media guidance application may determine, that an officiator of the sporting event stopped play for a specific situation. In response, the media guidance application may extract metadata that corresponds to the specific situation and compare the metadata that corresponds to the specific situation with metadata for similar situations that occurred in other similar sporting events. The media guidance application may identify a similar situation or event that occurred in another similar sporting event (e.g., the same sport) and generate for display video of the similar situation.

In some embodiments, the media guidance application may perform the following actions when providing media clips that depict referees' decisions that are similar to a decision made in a sporting event currently being consumed by the user. The media guidance application may detect a stoppage of play. Specifically, the media guidance application may determine, during playback of a sporting event and based on content of a sporting event, that a stoppage of play has occurred. For example, the media guidance application may analyze the subtitle feed and determine that the referee is talking. In some embodiments, the media guidance application may analyze the audio feed to determine that the commentators are discussing a play that has ended. In some embodiments, the media guidance application may analyze the video feed of the sporting event to determine that there is no game action in the frame, but instead the commentators or the referee is shown. This analysis may be performed by a video analysis algorithm. It should be noted that the media guidance application may use any combination of these three methods to make the determination that the sporting event has stopped. For example, the media guidance application may generate a score for each method as to whether the play has been stopped and combine the scores for the determination.

In response to determining that the stoppage of play has occurred, the media guidance application may access the different media streams of the media asset and determine whether the stoppage of play was caused by a game official. Specifically, in response to determining that the stoppage of play has occurred, the media guidance application may perform the following actions. The media guidance application may access one or more of an audio stream of the sporting event, a video stream of the sporting event, and a subtitle stream of the sporting event, and determine, based on one or more of the video stream, the audio stream, and the subtitle stream, whether the stoppage of play resulted from an ambiguous determination by an officiator of the sporting event. For example, the media guidance application may retrieve media files associated with each stream and determine the cause of the stoppage of play. For the audio stream, the media guidance application may execute a speech recognition algorithm for each word spoken, and compare the keywords with keywords known to be associated with the stoppage of play. The associated keywords may be stored in a database. For the subtitle stream the media guidance application may extract keywords from the subtitles and do a comparison similar to that of the audio stream. For the video stream, the media guidance application many perform image analysis on frames following the stoppage of play and if an official of the game is detected as an object of focus of one or more frames, the media guidance application may determine that the official caused the stoppage of play.

The media guidance application may extract metadata from the media when it determines that the stoppage of play was caused by a game official. Specifically, in response to determining that the stoppage of play resulted from the ambiguous determination, the media guidance application may extract, from the one or more of the audio stream, video stream, and subtitle stream of the sporting event, metadata that corresponds to the ambiguous determination by the officiator of the sporting event. For example, the media guidance application may extract words or phrases from the subtitles and the audio. The media guidance application may transmit a request for metadata entries, each describing content of a corresponding historical ambiguous event, where the request includes at least a portion of the metadata that corresponds to the ambiguous determination. For example, the media guidance application may transmit the phrases mentioned above in order to locate entries that describe similar situations in other games.

The media guidance application may receive, in response to the request, one or more historical ambiguous events that corresponds to the segment. For example, the media guidance application may receive media clips and metadata for other events where a similar ambiguous determination was made. The media guidance application may generate for display video of a historical ambiguous event of the one or more historical ambiguous events. For example, the media guidance application may generate for display one or more of the video clips.

FIG. 1 shows an illustrative example of a display screen showing an ambiguous determination by an officiator of a sporting event. In FIG. 1, the officiator of the sporting event 102 (referee of the hockey game) is signaling that a goal has not been scored because the puck has not crossed the line. This is an example of an ambiguous determination because it may not be clear whether the puck has crossed the line.

In some embodiments, the media guidance application may perform the following actions when determining, during the playback of the sporting event and based on the content of a sporting event, that the stoppage of play has occurred. The media guidance application may monitor the video stream of the sporting event, and determine, based on the monitoring, that the officiator of the sporting event is performing a pre-defined action. For example, the media guidance application may use image analysis to determine that the officiator of the sporting event is performing a specific movement or is standing in a specific position. In response to determining that the officiator of the sporting event is performing the pre-defined action, the media guidance application may determine that the stoppage of play has occurred. For example, the media guidance application may compare the movement or position of the referee to a database of known movements or positions. If the movement or position matches a movement or position stored in the database, the media guidance application may determine that the officiator is performing a pre-defined action.

In some embodiments, the media guidance application may, when determining, during the playback of the sporting event and based on the content of a sporting event, that a stoppage of play has occurred, perform the following actions. The media guidance application may monitor the subtitle stream for keywords associated with the stoppage of play and determine, based on keywords within the subtitle stream that the officiator of the sporting event caused the stoppage of play. For example, the media guidance application may monitor the subtitle stream (or the audio stream) and compare each detected word (e.g., said by a referee or a commentator) with words (e.g., in a database) that indicate that a referee (i.e., the officiator) stopped the game.

In some embodiments, the media guidance application may, when determining that the officiator of the sporting event is performing a pre-defined action, perform the following actions. The media guidance application may monitor the video stream of the sporting event and compare, within a plurality of frames of the video stream of the sporting event, one or more of a movement and position of the officiator of the sporting event with a plurality of database entries, each including one or more of a pre-determined movement and position of the officiator. The media guidance application may determine, based on comparing the one or more movement and position of the officiator of the sporting event with the plurality of database entries, that the officiator of the sporting event is performing a pre-defined action. For example, the media guidance application may use image analysis to determine that the officiator of the sporting event is performing a specific movement or is standing in a specific position. The media guidance application may compare the movement or position of the referee to a database of known movements or positions. If the movement or position matches a movement or position stored in the database, the media guidance application may determine the specific pre-defined action that the officiator is taking. Based on that action, the media guidance application may determine a reason for stoppage (e.g., a penalty in a hockey game).

In some embodiments, the media guidance application may, when determining whether the stoppage of play resulted from the ambiguous determination by the officiator of the sporting event perform the following actions. The media guidance application may monitor one or more of the subtitle stream of the sporting event and the audio stream of the sporting event and compare a plurality of words within the one or more of the subtitle stream of the sporting event and the audio stream of the sporting event with keywords associated with an ambiguous determination. The media guidance application may determine, based on comparing the plurality of words within the one or more of the subtitle stream of the sporting event and the audio stream of the sporting event with the keywords associated with the ambiguous determination, that the ambiguous determination by the officiator of the sporting event has occurred. For example, the media guidance application may transmit the plurality of words from the audio stream and/or the subtitle stream to a database and receive back an indication of whether the words match pre-defined words indicating an ambiguous determination.

In some embodiments, the media guidance application may, when extracting metadata that corresponds to the ambiguous determination by an officiator of the sporting event, perform the following actions. The media guidance application may analyze one or more of the subtitle stream and the audio stream following the stoppage of play and extract, based on the analyzing from the one or more of the subtitle stream and the audio stream, one or more keywords associated with the ambiguous determination. For example, the media guidance application may determine when the stoppage of play has occurred and retrieve the audio and subtitle stream data from that point. The media guidance application may run audio analysis on the audio stream to extract word data from the audio stream, and also run an extraction routine to extract words from the subtitle stream.

In some embodiments, the media guidance application may, when analyzing one or more of the subtitle stream and the audio stream following the stoppage of play, perform the following actions. The media guidance application may scan the video stream for a time when the sporting event resumed after the stoppage of play and analyze the one or more of the subtitle stream and the audio stream between a time the stoppage of the sporting event occurred and the time when the sporting event resumed. For example, at the stoppage, the media guidance application may mark that time within the media asset as a start time for storing metadata, and when the media asset resumes after the stoppage, the media guidance application may mark that time as the stop time for storing metadata. In some embodiments, this time may include any video review process initiated by the officiator of the sporting event in this interval.

The media guidance application may, when extracting the one or more keywords associated with the ambiguous determination, perform the following actions. The media guidance application may extract, from one or more of the audio stream and subtitle stream, a plurality of words detected following the stoppage of play, and compare each word of the plurality of words with each of a plurality of keywords known to be associated with ambiguous determinations. The media guidance application may store those words of the plurality of words that match one or more of the plurality of keywords known to be associated with the ambiguous determinations. For example, the media guidance application may transmit the extracted words to a database that stores keywords known to be associated with ambiguous determinations and receive a response identifying any matching words.

In some embodiments, the media guidance application may select one of several received similar game situations to present to the user based on the amount of metadata matching between the current situation and the historical one. Specifically, the media guidance application may determine that a plurality of historical ambiguous events was received in response to the request, and select the historical ambiguous event of the plurality of ambiguous events based on a number of an amount of extracted keywords matching a number of keywords associated with the historical ambiguous event. For example, the media guidance application may calculate a ratio of matching words, a percentage of matching words, or a number of matching words and determine which historical ambiguous event has the larger value when selecting a historical ambiguous event to present to the user.

In some embodiments, the media guidance application may present, to the user, multiple historical events so the user can choose one to view. Specifically, the media guidance application may generate for display one or more indications for the one or more historical ambiguous events, and in response to a user selection of an indication of the one or more indications, generate for simultaneous display a historical ambiguous event corresponding to the selected indication and a media segment associated with the ambiguous determination. For example, the media guidance application may generate for display a grid of different historical events for the user and enable the user to choose the one desired.

In some embodiments, the media guidance application may provide, in response to a user utterance, media content similar to ambiguous determinations at sporting events. The media guidance application may detect a user utterance (e.g., using a microphone connected to or part of a device where the media guidance application resides). The media guidance application may identify the situation (e.g., in a sporting event) that the user was referring to. The media guidance application may compare metadata of the identified segment with metadata of a plurality of historical ambiguous events (e.g., other similar situations in other events), and determine, based on the comparing, a historical ambiguous event (e.g., identify a media clip with a similar situation) that corresponds to the segment. The media guidance application may generate for display video including the historical ambiguous event (e.g., play the clip of the similar situation) that corresponds to the segment.

Figure 2:
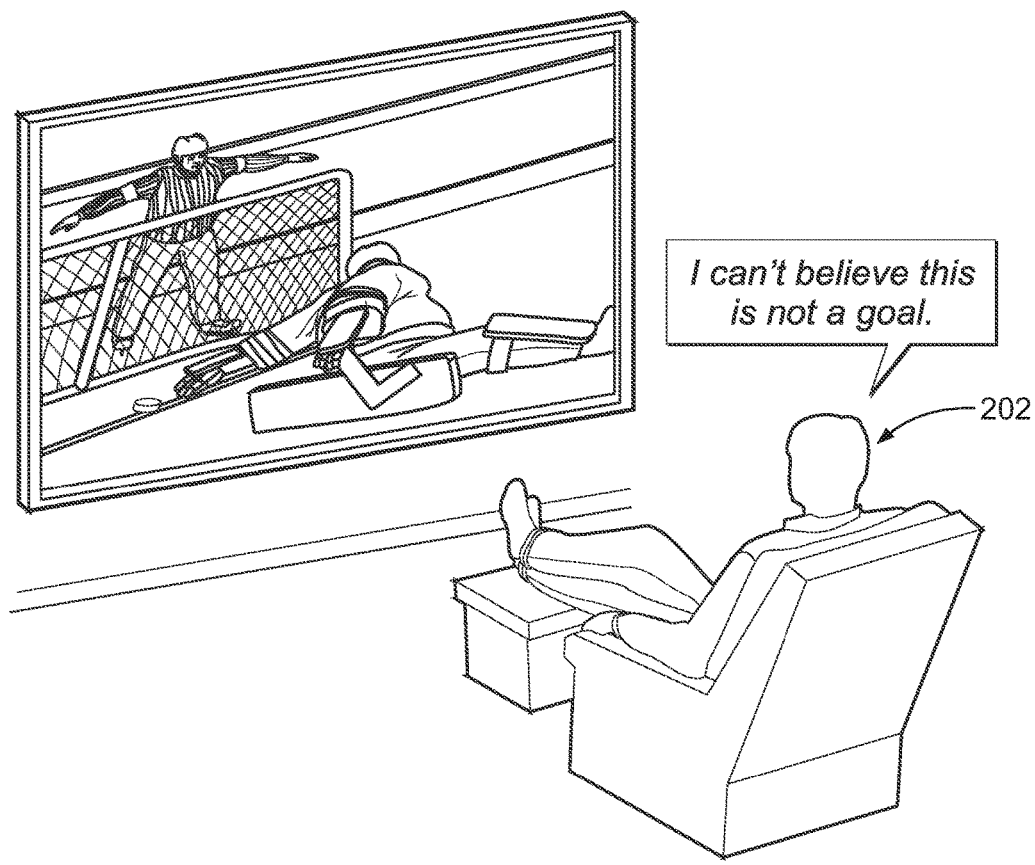
FIG. 2 shows an illustrative example of a display screen showing a user utterance that references an ambiguous determination of an officiator of a sporting event, in accordance with some embodiments of the disclosure.

FIG. 2 shows an illustrative example of a display screen showing a user utterance that references an ambiguous determination of an officiator of a sporting event. In FIG. 2, the media guidance application detects a user utterance, "I cannot believe this is not a goal," from the user, and based on that utterance initiates the process to identify media asset segments that are similar in nature to the ambiguous determination related to the user utterance.

In some embodiments, the media guidance application may detect that a user said something about a sporting event that the user is consuming. Specifically, the media guidance application may detect, during playback of the sporting event, a user utterance that references an ambiguous determination by an officiator of a sporting event. For example, the media guidance application may use a microphone to pick up ambient noise. The media guidance application may detect speech from a user that refers to the sporting event.

The media guidance application may identify the play that the user was referring to. Specifically, the media guidance application may determine a segment of the sporting event that corresponds to the ambiguous determination. For example, the media guidance application may identify the segment that the user is referring to, based on a specific, pre-determined length of time for the type of sporting event (e.g., different sports may have different pre-determined lengths).

The media guidance application may extract audio data and subtitle data from the determined segment. Specifically, the media guidance application may extract, from the one or more of the audio stream, video stream, and subtitle stream of the sporting event, metadata that corresponds to the segment. For example, the media guidance application may access the audio stream for the segment and execute speech detection on the audio stream to identify words in the stream. The words may be stored as metadata for the segment. In some embodiments, the media guidance application may extract words from the subtitle stream and save those words as part of the metadata. In some embodiments, the media guidance application may execute image analysis on the frames of the media asset and generate keywords based on the image analysis. The media guidance application may store the keywords as part of the metadata for the segment. In some embodiments, some or all of the components (audio, subtitle, and video) may be added to the metadata.

The media guidance application may transmit a request for similar plays to present to the user. Specifically, the media guidance application may transmit a request for metadata entries, each describing content of a corresponding historical ambiguous event, where the request includes at least a portion of the metadata that corresponds to the segment. For example, the media guidance application may transmit a query that includes some or all keywords or key phrases to a database. In response, the media guidance application may receive matching clips of historical ambiguous events.

The media guidance application may receive, in response, similar plays to present to the user. Specifically, the media guidance application may receive, in response to the request, one or more historical ambiguous events that correspond to the segment. For example, the media guidance application may receive, in response to the query media assets and media asset metadata matching the ambiguous determination. In some embodiments, the media guidance application may receive the metadata without the video clips. The media guidance application may select one of the clips based on the metadata and receive one clip that is to be presented to the user.

In some embodiments, the media guidance application may, when detecting the user utterance that references the ambiguous determination by an officiator of a sporting event, perform the following actions. The media guidance application may detect, using a microphone, the user utterance. The media guidance application may transform the user utterance into a plurality of keywords. For example, the media guidance application may use a speech recognition algorithm to transform the utterance into keywords and/or phrases. The media guidance application may try to locate similar media assets or media asset segments. Specifically, the media guidance application may compare the plurality of keywords with words that are associated with ambiguous determinations associated with the sporting event. For example, the media guidance application may compare the extracted words to keywords indicating close/questionable decisions by transmitting to the database the keywords. If the keywords match, the media guidance application may determine that the user's utterance refers to a situation in the game. Specifically, the media guidance application may, in response to determining, based on the comparing, that the plurality of keywords matches the words that are associated with the ambiguous determinations associated with the sporting event, determine that the user utterance references the ambiguous determination by the officiator of the sporting event. For example, the media guidance application may compare the keywords with keywords in a database that stores keywords associated with ambiguous determinations.

In some embodiments, the media guidance application may, when determining the segment of the sporting event that corresponds to the ambiguous determination, take the following actions. The media guidance application may identify a time within the sporting event when the user utterance was detected. Specifically, the media guidance application may determine a time within the sporting event that corresponds to a time of the user utterance. For example, the media guidance application may mark the time within the media asset when the user utterance was detected. The media guidance application may retrieve a segment interval associated with the ambiguous determination. For example, the media guidance application may retrieve a pre-determined value. The pre-determined value may be based on a type of the sporting event. The media guidance application may store the segment interval based on the retrieved value. Specifically, the media guidance application may determine the segment of the sporting event based on the segment interval. For example, the media guidance application may generate a segment interval by adding the pre-determined value to the marked time.

In some embodiments, the media guidance application may determine the segment of the sporting event related to the user utterance by scanning backwards until the referee is seen (i.e., the referee making the determination). The media guidance application may determine a time within the sporting event that corresponds to a time of the user utterance. For example, the media guidance application may determine that the user utterance was detected at a specific time. The media guidance application may scan the sporting event backwards from the time within the sporting event that corresponds to the time of the user utterance until the officiator of the sporting event is in focus. For example, the media guidance application may analyze every frame until the officiator of the sporting event is in focus (e.g., the referee is the biggest object on the screen). The media guidance application may set a time within the sporting event when the officiator of the sporting event is in focus as an end time of the segment. The media guidance application may store that time as the end time of the segment. The media guidance application may continue to scan backwards until the referee is in focus again. Specifically, the media guidance application may analyze each frame of the sporting event backwards from the time within the sporting event that the officiator of the sporting event was in focus until a next time the officiator of the sporting event is in focus, and set the next time the officiator of the sporting event is in focus as a start time of the segment.

In some embodiments, the media guidance application may determine whether the user's utterance references a situation in a sporting event by analyzing subtitle and audio feeds to determine if the user utterance is related to any data (e.g., words within those feeds). Specifically, the media guidance application may access one or more of the audio stream and the subtitle stream of the sporting event and determine a time within one or more of the audio stream and the subtitle stream corresponding to a time of the user utterance. For example, the media guidance application may determine that the user utterance occurred at a specific time within the media asset and access a portion of the audio stream and/or subtitle at that time mark. The media guidance application may compare one or more of subtitle data and audio data with data of the user utterance. For example, the media guidance application may compare words from the user utterance with words in the subtitles and audio a number of minutes or seconds prior to the user utterance. The media guidance application may determine the length of time for the comparison based on the type of the sporting event. The media guidance application may, in response to determining, based on the comparing, that one or more of the subtitle data and the audio data matches the data of the utterance, detect the user utterance that references the ambiguous determination by the officiator of the sporting event. For example, if the user utterance includes words that match words (e.g., stored in a database) that are known to be associated with the type of the sporting event, the media guidance application may determine that the user utterance is related to the sporting event.

In some embodiments, the media guidance application may, when extracting metadata that corresponds to the segment, perform the following actions. The media guidance application may analyze one or more of the subtitle stream and the audio stream of the segment and extract, based on the analyzing from the one or more of the subtitle stream and the audio stream, one or more keywords associated with the segment. For example, the media guidance application may determine when the stoppage of play has occurred and retrieve the audio and subtitle stream data from that point. The media guidance application may run audio analysis on the audio stream to extract word data from the audio stream, and also run an extraction routine to extract words from the subtitle stream.

In some embodiments, the media guidance application may, when analyzing one or more of the subtitle stream and the audio stream of the segment, perform the following actions. The media guidance application may scan the video stream for a time when the sporting event resumed after the user utterance and analyze the one or more of the subtitle stream and the audio stream between a time of the user utterance and the time when the sporting event resumed. For example, the media guidance application may mark the time of the user utterance as a start time for storing metadata and, when the sporting event resumes, the media guidance application may mark that time as the stop time for storing metadata.

The media guidance application may, when extracting the one or more keywords associated with the segment, perform the following actions. The media guidance application may extract, from one or more of the audio stream and subtitle stream, a plurality of words detected following the stoppage of play, and compare each word of the plurality of words with each of a plurality of keywords known to be associated with ambiguous determinations. The media guidance application may store those words of the plurality of words that match one or more of the plurality of keywords known to be associated with the segment. For example, the media guidance application may transmit the extracted words to a database that stores keywords known to be associated with ambiguous determinations and receive a response identifying any matching words.

In some embodiments, the media guidance application may select one of several received similar game situations to present to the user based on the amount of metadata matching between the current situation and the historical one.

Specifically, the media guidance application may determine that a plurality of historical ambiguous events was received in response to the request, and select the historical ambiguous event of the plurality of ambiguous events based on a number of an amount of extracted keywords matching a number of keywords associated with the ambiguous determination. For example, the media guidance application may calculate a ratio of matching words, a percentage of matching words, or a number of matching words and determine which historical ambiguous event has the largest value when selecting a historical ambiguous event to present to the user.

In some embodiments, the media guidance application may present, to the user, multiple historical events so the user can choose one to view. Specifically, the media guidance application may generate for display one or more indications for the one or more historical ambiguous events, and in response to a user selection of an indication of the one or more indications, generate for simultaneous display a historical ambiguous event corresponding to the selected indication and a media segment associated with the ambiguous determination. For example, the media guidance application may generate for display a grid of different historical events for the user and enable the user to choose the one desired.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), on-demand information, blogs, websites, and any other type of guidance data that is helpful for a user to navigate among and locate desired content selections.

Figure 3:
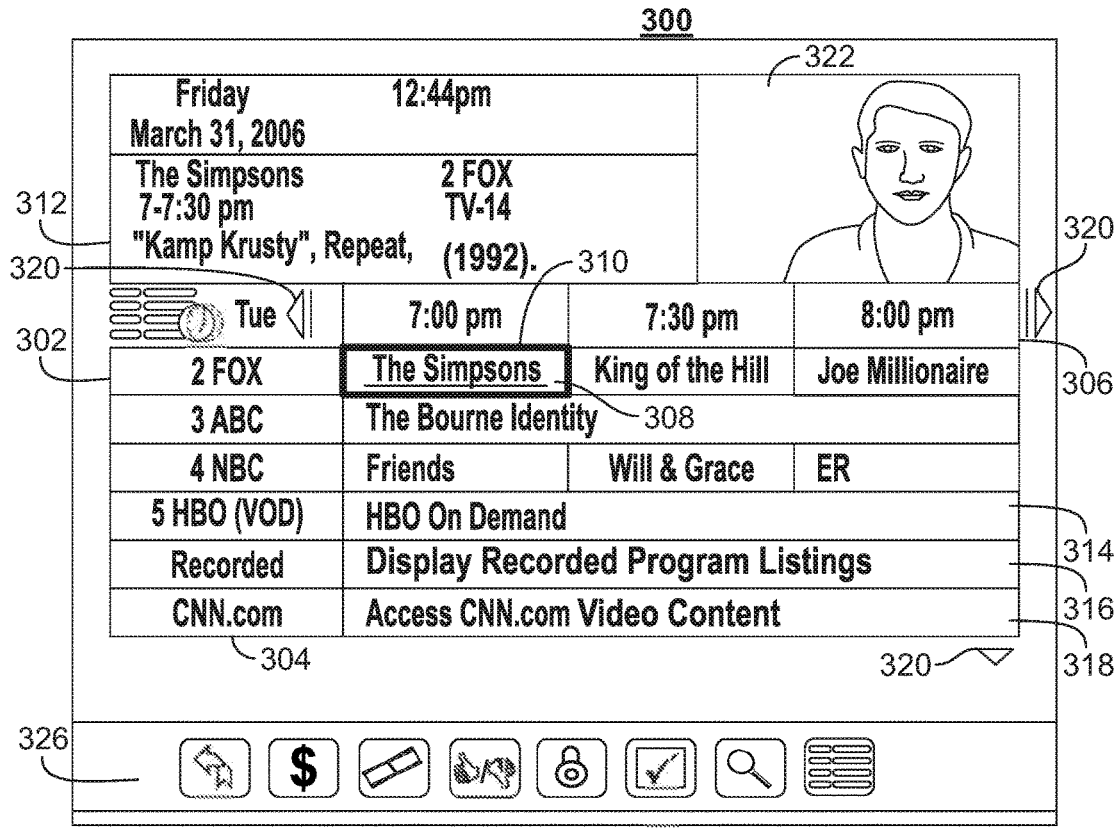
FIG. 3 shows an illustrative example of a display screen for use in accessing media content, in accordance with some embodiments of the disclosure.
Figure 4:
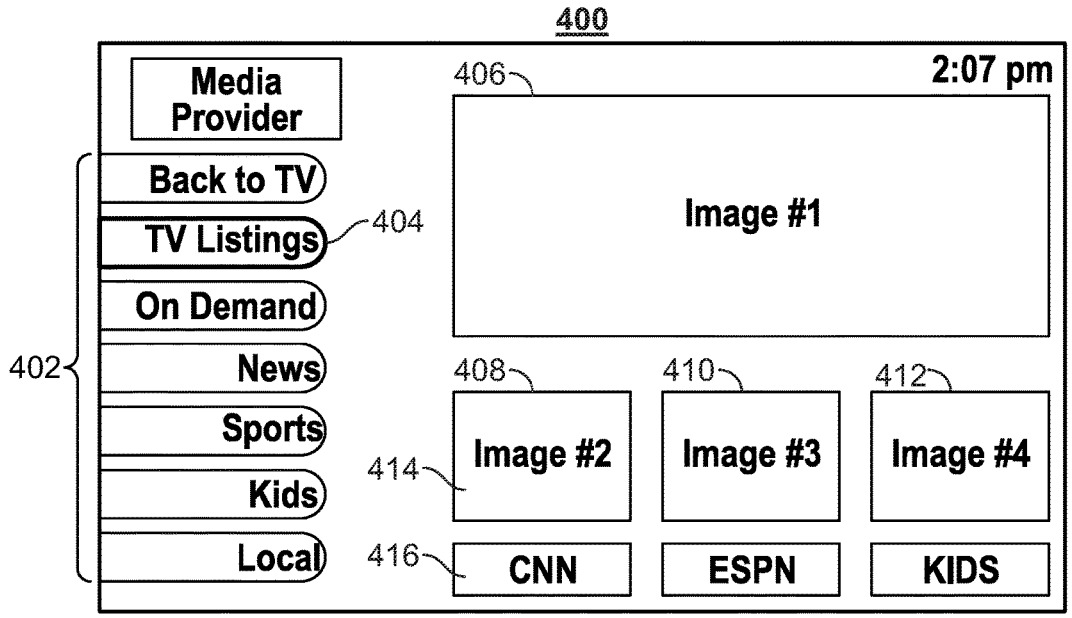
FIG. 4 shows another illustrative example of a display screen for use in accessing media content, in accordance with some embodiments of the disclosure.

FIGS. 3-4 show illustrative display screens that may be used to provide media guidance data. The display screens shown in FIGS. 3-4 may be implemented on any suitable user equipment device or platform. While the displays of FIGS. 3-4 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 3 shows illustrative grid of a program listings display 300 arranged by time and channel that also enables access to different types of content in a single display. Display 300 may include grid 302 with: (1) a column of channel/content type identifiers 304, where each channel/content type identifier (which is a cell in the column) identifies a different channel or content type available; and (2) a row of time identifiers 306, where each time identifier (which is a cell in the row) identifies a time block of programming. Grid 302 also includes cells of program listings, such as program listing 308, where each listing provides the title of the program provided on the listing's associated channel and time. With a user input device, a user can select program listings by moving highlight region 310. Information relating to the program listing selected by highlight region 310 may be provided in program information region 312. Region 312 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 302 may provide media guidance data for non-linear programming including on-demand listing 314, recorded content listing 316, and Internet content listing 318. A display combining media guidance data for content from different types of content sources is sometimes referred to as a "mixed-media" display. Various permutations of the types of media guidance data that may be displayed that are different than display 300 may be based on user selection or guidance application definition (e.g., a display of only recorded and broadcast listings, only on-demand and broadcast listings, etc.). As illustrated, listings 314, 316, and 318 are shown as spanning the entire time block displayed in grid 302 to indicate that selection of these listings may provide access to a display dedicated to on-demand listings, recorded listings, or Internet listings, respectively. In some embodiments, listings for these content types may be included directly in grid 302. Additional media guidance data may be displayed in response to the user selecting one of the navigational icons 320. (Pressing an arrow key on a user input device may affect the display in a similar manner as selecting navigational icons 320.)

Display 300 may also include video region 322, and options region 326. Video region 322 may allow the user to view and/or preview programs that are currently available, will be available, or were available to the user. The content of video region 322 may correspond to, or be independent from, one of the listings displayed in grid 302. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Options region 326 may allow the user to access different types of content, media guidance application displays, and/or media guidance application features. Options region 326 may be part of display 300 (and other display screens described herein), or may be invoked by a user by selecting an on-screen option or pressing a dedicated or assignable button on a user input device. The selectable options within options region 326 may concern features related to program listings in grid 302 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.Tivo.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 6. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 4. Video mosaic display 400 includes selectable options 402 for content information organized based on content type, genre, and/or other organization criteria. In display 400, television listings option 404 is selected, thus providing listings 406, 408, 410, and 412 as broadcast program listings. In display 400 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 408 may include more than one portion, including media portion 414 and text portion 416. Media portion 414 and/or text portion 416 may be selectable to view content in full-screen or to view information related to the content displayed in media portion 414 (e.g., to view listings for the channel that the video is displayed on).

The listings in display 400 are of different sizes (i.e., listing 406 is larger than listings 408, 410, and 412), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Nov. 12, 2009, which is hereby incorporated by reference herein in its entirety.

Figure 5:
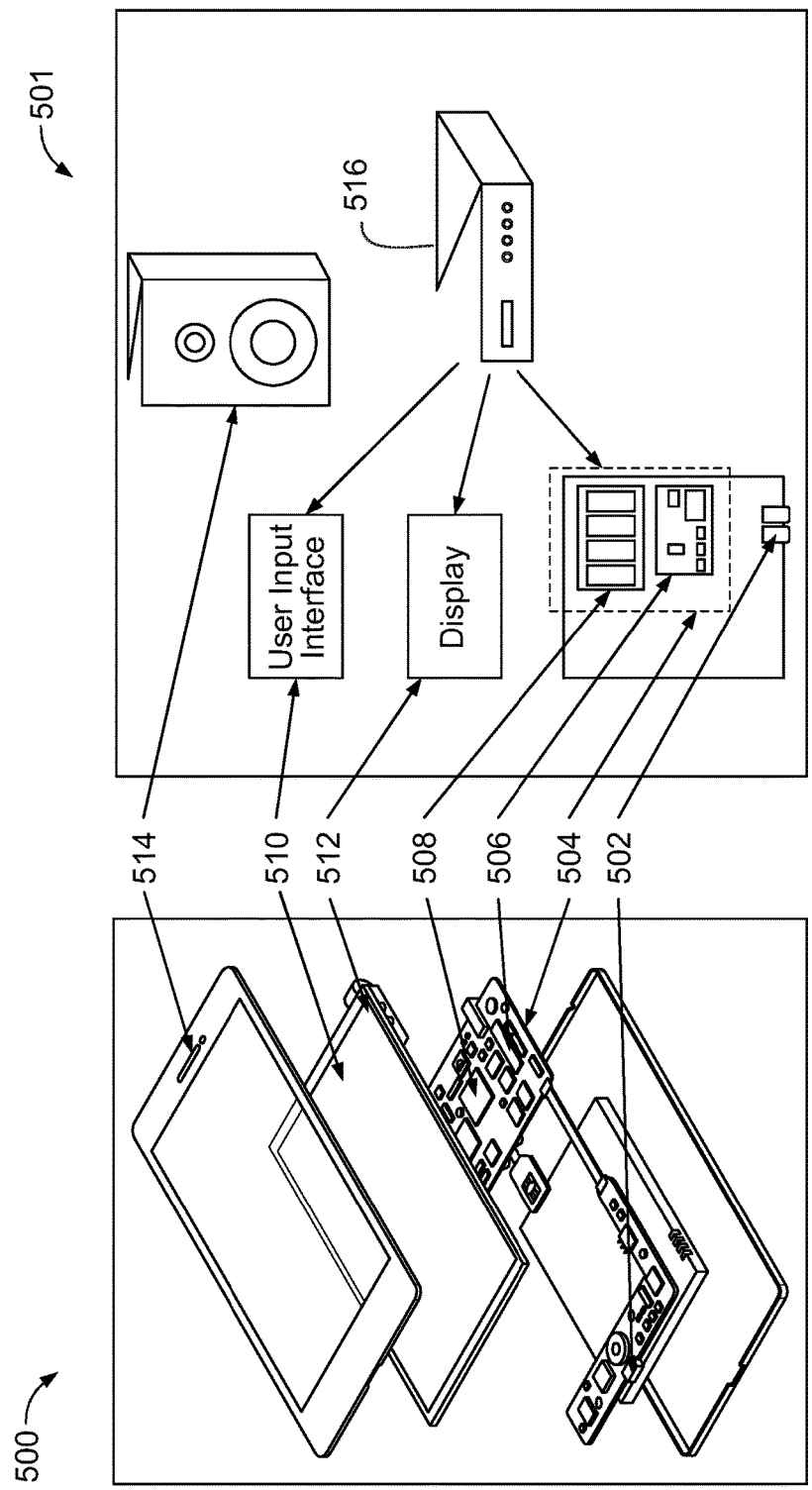
FIG. 5 is a block diagram of an illustrative user equipment device, in accordance with some embodiments of the disclosure.

Users may access content and the media guidance application (and its display screens described above and below) from one or more of their user equipment devices. FIG. 5 shows generalized embodiments of illustrative user equipment devices 500 and 501. For example, user equipment device 500 may be a smartphone device. In another example, user equipment system 501 may be a user television equipment system. User television equipment system 501 may include a set-top box 516. Set-top box 516 may be communicatively connected to speaker 514 and display 512. In some embodiments, display 512 may be a television display or a computer display. In some embodiments, set top box 516 may be communicatively connected to user interface input 510. In some embodiments, user interface input 510 may be a remote control device. Set-top box 516 may include one or more circuit boards. In some embodiments, the circuit boards may include processing circuitry, control circuitry, and storage (e.g., RAM, ROM, Hard Disk, Removable Disk, etc.). In some embodiments, circuit board 324 may include an input/output path. More specific implementations of user equipment devices are discussed below in connection with FIG. 6. Each one of user equipment device 500 and 501 may receive content and data via input/output (hereinafter "I/O") path 502. I/O path 502 may provide content (e.g., broadcast programming, on-demand programming, Internet content, content available over a local area network (LAN) or wide area network (WAN), and/or other content) and data to control circuitry 504, which includes processing circuitry 506 and storage 508. Control circuitry 504 may be used to send and receive commands, requests, and other suitable data using I/O path 502. I/O path 502 may connect control circuitry 504 (and specifically processing circuitry 506) to one or more communications paths (described below). I/O functions may be provided by one or more of these communications paths, but are shown as a single path in FIG. 5 to avoid overcomplicating the drawing.

Control circuitry 504 may be based on any suitable processing circuitry such as processing circuitry 506. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 504 executes instructions for a media guidance application stored in memory (i.e., storage 508). Specifically, control circuitry 504 may be instructed by the media guidance application to perform the functions discussed above and below. For example, the media guidance application may provide instructions to control circuitry 504 to generate the media guidance displays. In some implementations, any action performed by control circuitry 504 may be based on instructions received from the media guidance application.

In client-server based embodiments, control circuitry 504 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 6). In addition, communications circuitry may include circuitry that enables peer-to-peer communication of user equipment devices, or communication of user equipment devices in locations remote from each other (described in more detail below).

Memory may be an electronic storage device provided as storage 508 that is part of control circuitry 504. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 508 may be used to store various types of content described herein as well as media guidance data described above. Nonvolatile memory may also be used (e.g., to launch a boot-up routine and other instructions). Cloud-based storage, described in relation to FIG. 6, may be used to supplement storage 508 or instead of storage 508.

Control circuitry 504 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 504 may also include scaler circuitry for upconverting and downconverting content into the preferred output format of each of the user equipment 500 and user equipment system 501. Circuitry 504 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 508 is provided as a separate device from each of user equipment 500 and user equipment system 501, the tuning and encoding circuitry (including multiple tuners) may be associated with storage 508.

A user may send instructions to control circuitry 504 using user input interface 510. User input interface 510 may be any suitable user interface, such as a remote control, mouse, trackball, keypad, keyboard, touch screen, touchpad, stylus input, joystick, voice recognition interface, or other user input interfaces. Display 512 may be provided as a stand-alone device or integrated with other elements of each of user equipment device 500 and user equipment system 501. For example, display 512 may be a touchscreen or touch-sensitive display. In such circumstances, user input interface 510 may be integrated with or combined with display 512. Display 512 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 512 may be HDTV-capable. In some embodiments, display 512 may be a 3D display, and the interactive media guidance application and any suitable content may be displayed in 3D. A video card or graphics card may generate the output to the display 512. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 504. The video card may be integrated with the control circuitry 504. Speakers 514 may be provided as integrated with other elements of each of user equipment device 500 and user equipment system 501 or may be stand-alone units. The audio component of videos and other content displayed on display 512 may be played through speakers 514. In some embodiments, the audio may be distributed to a receiver (not shown), which processes and outputs the audio via speakers 514.

The guidance application may be implemented using any suitable architecture. For example, it may be a stand-alone application wholly-implemented on each of user equipment device 500 and user equipment system 501. In such an approach, instructions of the application are stored locally (e.g., in storage 508), and data for use by the application is downloaded on a periodic basis (e.g., from an out-of-band feed, from an Internet resource, or using another suitable approach). Control circuitry 504 may retrieve instructions of the application from storage 508 and process the instructions to generate any of the displays discussed herein. Based on the processed instructions, control circuitry 504 may determine what action to perform when input is received from input interface 510. For example, movement of a cursor on a display up/down may be indicated by the processed instructions when input interface 510 indicates that an up/down button was selected.

In some embodiments, the media guidance application is a client-server based application. Data for use by a thick or thin client implemented on each of user equipment device 500 and user equipment system 501 is retrieved on-demand by issuing requests to a server remote to each of user equipment device 500 and user equipment system 501. In one example of a client-server based guidance application, control circuitry 504 runs a web browser that interprets web pages provided by a remote server. For example, the remote server may store the instructions for the application in a storage device. The remote server may process the stored instructions using circuitry (e.g., control circuitry 504) and generate the displays discussed above and below. The client device may receive the displays generated by the remote server and may display the content of the displays locally on each of user equipment device 500 and user equipment system 501. This way, the processing of the instructions is performed remotely by the server while the resulting displays are provided locally on each of user equipment device 500 and user equipment system 501. Each of user equipment device 500 and user equipment system 501 may receive inputs from the user via input interface 510 and transmit those inputs to the remote server for processing and generating the corresponding displays. For example, each of user equipment device 500 and user equipment system 501 may transmit a communication to the remote server indicating that an up/down button was selected via input interface 510. The remote server may process instructions in accordance with that input and generate a display of the application corresponding to the input (e.g., a display that moves a cursor up/down). The generated display is then transmitted to each of user equipment device 500 and user equipment system 501 for presentation to the user.

In some embodiments, the media guidance application is downloaded and interpreted or otherwise run by an interpreter or virtual machine (run by control circuitry 504). In some embodiments, the guidance application may be encoded in the ETV Binary Interchange Format (EBIF), received by control circuitry 504 as part of a suitable feed, and interpreted by a user agent running on control circuitry 504. For example, the guidance application may be an EBIF application. In some embodiments, the guidance application may be defined by a series of JAVA-based files that are received and run by a local virtual machine or other suitable middleware executed by control circuitry 504. In some of such embodiments (e.g., those employing MPEG-2 or other digital media encoding schemes), the guidance application may be, for example, encoded and transmitted in an MPEG-2 object carousel with the MPEG audio and video packets of a program.

Figure 6:
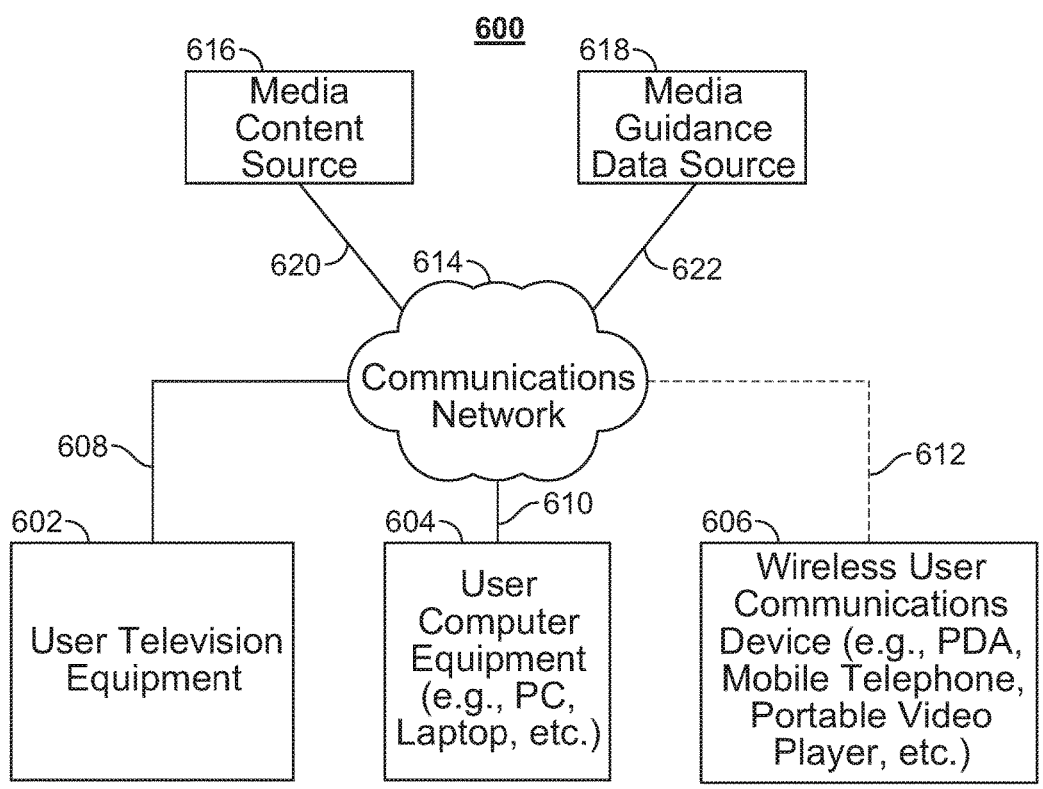
FIG. 6 is a block diagram of an illustrative media system, in accordance with some embodiments of the disclosure.

Each of user equipment device 500 and user equipment system 501 of FIG. 5 can be implemented in system 600 of FIG. 6 as user television equipment 602, user computer equipment 604, wireless user communications device 606, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a stand-alone device or may be part of a network of devices. Various network configurations of devices may be implemented and are discussed in more detail below.

A user equipment device utilizing at least some of the system features described above in connection with FIG. 5 may not be classified solely as user television equipment 602, user computer equipment 604, or a wireless user communications device 606. For example, user television equipment 602 may, like some user computer equipment 604, be Internet-enabled allowing for access to Internet content, while user computer equipment 604 may, like some television equipment 602, include a tuner allowing for access to television programming. The media guidance application may have the same layout on various different types of user equipment or may be tailored to the display capabilities of the user equipment. For example, on user computer equipment 604, the guidance application may be provided as a web site accessed by a web browser. In another example, the guidance application may be scaled down for wireless user communications devices 606.

In system 600, there is typically more than one of each type of user equipment device but only one of each is shown in FIG. 6 to avoid overcomplicating the drawing. In addition, each user may utilize more than one type of user equipment device and also more than one of each type of user equipment device.

In some embodiments, a user equipment device (e.g., user television equipment 602, user computer equipment 604, wireless user communications device 606) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.Tivo.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 614. Namely, user television equipment 602, user computer equipment 604, and wireless user communications device 606 are coupled to communications network 614 via communications paths 608, 610, and 612, respectively. Communications network 614 may be one or more networks including the Internet, a mobile phone network, mobile voice or data network (e.g., a 4G or LTE network), cable network, public switched telephone network, or other types of communications network or combinations of communications networks. Paths 608, 610, and 612 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 612 is drawn with dotted lines to indicate that in the exemplary embodiment shown in FIG. 6 it is a wireless path and paths 608 and 610 are drawn as solid lines to indicate they are wired paths (although these paths may be wireless paths, if desired). Communications with the user equipment devices may be provided by one or more of these communications paths, but are shown as a single path in FIG. 6 to avoid overcomplicating the drawing.

Although communications paths are not drawn between user equipment devices, these devices may communicate directly with each other via communication paths, such as those described above in connection with paths 608, 610, and 612, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 614.

System 600 includes content source 616 and media guidance data source 618 coupled to communications network 614 via communication paths 620 and 622, respectively. Paths 620 and 622 may include any of the communication paths described above in connection with paths 608, 610, and 612. Communications with the content source 616 and media guidance data source 618 may be exchanged over one or more communications paths, but are shown as a single path in FIG. 6 to avoid overcomplicating the drawing. In addition, there may be more than one of each of content source 616 and media guidance data source 618, but only one of each is shown in FIG. 6 to avoid overcomplicating the drawing. (The different types of each of these sources are discussed below.) If desired, content source 616 and media guidance data source 618 may be integrated as one source device. Although communications between sources 616 and 618 with user equipment devices 602, 604, and 606 are shown as through communications network 614, in some embodiments, sources 616 and 618 may communicate directly with user equipment devices 602, 604, and 606 via communication paths (not shown) such as those described above in connection with paths 608, 610, and 612.

Content source 616 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 616 may be the originator of content (e.g., a television broadcaster, a Webcast provider, etc.) or may not be the originator of content (e.g., an on-demand content provider, an Internet provider of content of broadcast programs for downloading, etc.). Content source 616 may include cable sources, satellite providers, on-demand providers, Internet providers, over-the-top content providers, or other providers of content.

Content source 616 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 618 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 618 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 618 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 618 may provide user equipment devices 602, 604, and 606 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions that entice the user to keep the particular service or source indicated by the score as one to which the user will likely terminate access.

Media guidance applications may be, for example, stand-alone applications implemented on user equipment devices. For example, the media guidance application may be implemented as software or a set of executable instructions which may be stored in storage 508, and executed by control circuitry 504 of each of user equipment device 500 and user equipment system 501. In some embodiments, media guidance applications may be client-server applications where only a client application resides on the user equipment device, and server application resides on a remote server. For example, media guidance applications may be implemented partially as a client application on control circuitry 504 of each of user equipment device 500 and user equipment system 501 and partially on a remote server as a server application (e.g., media guidance data source 618) running on control circuitry of the remote server. When executed by control circuitry of the remote server (such as media guidance data source 618), the media guidance application may instruct the control circuitry to generate the guidance application displays and transmit the generated displays to the user equipment devices. The server application may instruct the control circuitry of the media guidance data source 618 to transmit data for storage on the user equipment. The client application may instruct control circuitry of the receiving user equipment to generate the guidance application displays.

Content and/or media guidance data delivered to user equipment devices 602, 604, and 606 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 600 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 6.

In one approach, user equipment devices may communicate with each other within a home network. User equipment devices can communicate with each other directly via short-range point-to-point communication schemes described above, via indirect paths through a hub or other similar device provided on a home network, or via communications network 614. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 616 to access content. Specifically, within a home, users of user television equipment 602 and user computer equipment 604 may access the media guidance application to navigate among and locate desirable content. Users may also access the media guidance application outside of the home using wireless user communications devices 606 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 614. These cloud resources may include one or more content sources 616 and one or more media guidance data sources 618. In addition or in the alternative, the remote computing sites may include other user equipment devices, such as user television equipment 602, user computer equipment 604, and wireless user communications device 606. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 604 or wireless user communications device 606 having content capture feature.

Alternatively, the user can first transfer the content to a user equipment device, such as user computer equipment 604. The user equipment device storing the content uploads the content to the cloud using a data transmission service on communications network 614. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 5.

As referred herein, the term "in response to" refers to initiated as a result of. For example, a first action being performed in response to a second action may include interstitial steps between the first action and the second action. As referred herein, the term "directly in response to" refers to caused by. For example, a first action being performed directly in response to a second action may not include interstitial steps between the first action and the second action.

Figure 7:
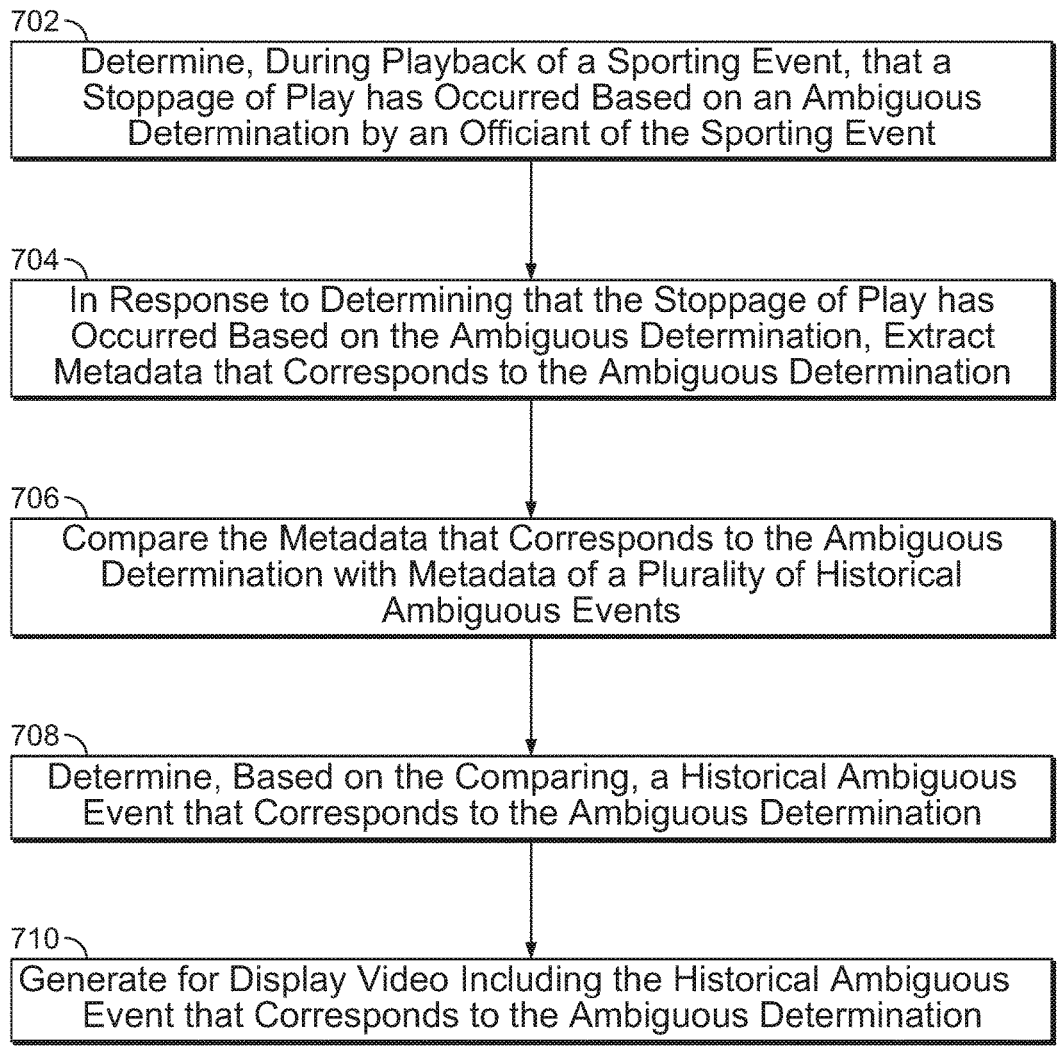
FIG. 7 is a flowchart of illustrative actions for providing media asset segments related to ambiguous determinations made at sporting events, in accordance with some embodiments of the disclosure.

FIG. 7 is a flowchart of illustrative actions for providing media asset segments related to ambiguous determinations made at sporting events. At 702, control circuitry 504 determines, during playback of the sporting event, that a stoppage of play has occurred based on an ambiguous determination by an officiator of the sporting event. For example, the control circuitry may monitor one or more of the audio stream, the video stream, and the subtitle stream to make the determination.

At 704, control circuitry 504 may, in response to determining that the stoppage of play has occurred based on the ambiguous determination, extract metadata that corresponds to the ambiguous determination. For example, the control circuitry may retrieve the metadata from storage 508. In some embodiments, the control circuitry may retrieve the metadata from a remote server (e.g., a server associated with media content source 616 and/or media guidance data source 618) via I/O path 502 and/or communications network 614.

At 706, control circuitry 504 compares the metadata that corresponds to the ambiguous determination with metadata of a plurality of historical ambiguous events. For example, the control circuitry may retrieve the metadata of the plurality of historical ambiguous events from storage 508 and compare the retrieved metadata with metadata that corresponds to the ambiguous determination. In some embodiments, the media guidance application may transmit, as part of a properly formatted request, part or all of the metadata for the ambiguous determination to a remote server (e.g., a remote server associated with media content source 616 and/or media guidance data source 618 over communications network 614) and receive in response metadata for historical ambiguous events.

At 708, control circuitry 504 determines, based on the comparing, a historical ambiguous event that corresponds to the ambiguous determination. For example, the control circuitry may determine, based on an amount of metadata matching, a historical ambiguous event to present to the user. The media guidance application may transmit (e.g., via communications network 614) a request for the media asset corresponding to the determined historical ambiguous event. At 710, control circuitry 504 generates for display (e.g., on display 512) video that corresponds to the ambiguous determination.

Figure 8:
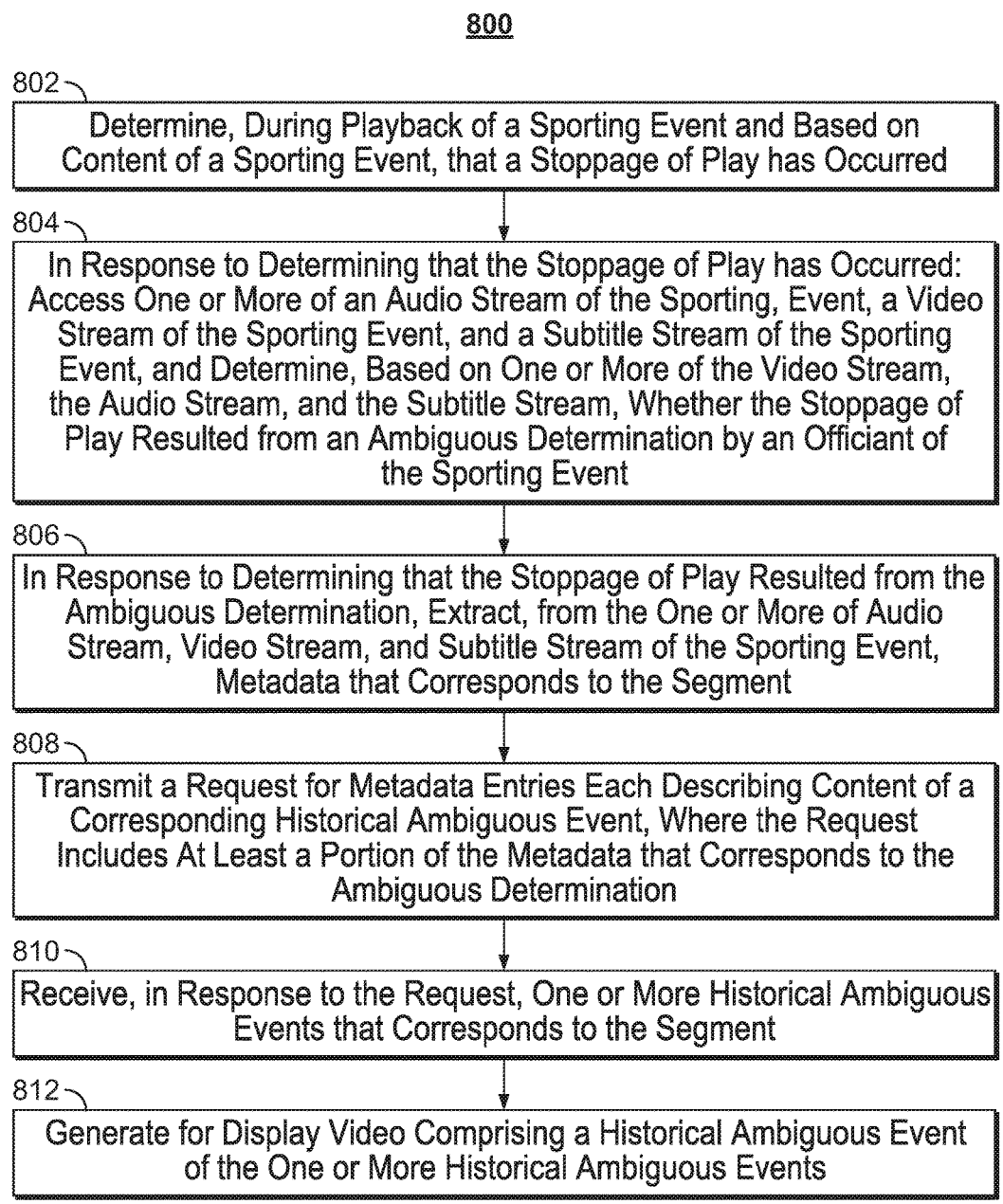
FIG. 8 is another flowchart of illustrative actions for providing media asset segments related to ambiguous determinations made at sporting events, in accordance with some embodiments of the disclosure.

FIG. 8 is another flowchart of illustrative actions for providing media asset segments related to ambiguous determinations made at sporting events. At 802, control circuitry 504 determines, during playback of a sporting event and based on content of a sporting event, that a stoppage of play has occurred. For example, the control circuitry may analyze the video frames of the sporting event to determine whether the sporting event is being focused on.

At 804, control circuitry 504, in response to determining that the stoppage of play has occurred, accesses one or more of an audio stream of the sporting event, a video stream of the sporting event, and a subtitle stream of the sporting event, and determines, based on one or more of the video stream, the audio stream, and the subtitle stream, whether the stoppage of play resulted from an ambiguous determination by an officiator of the sporting event. For example, the control circuitry may retrieve the audio stream, the subtitle stream, and the video stream from storage 508. In some embodiments, the control circuitry may retrieve the streams from a remote server (e.g., a server associated with media content source 616 and/or media guidance data source 518).

At 806, control circuitry 504 may, in response to determining that the stoppage of play resulted from the ambiguous determination, extract, from the one or more of the audio stream, video stream, and subtitle stream of the sporting event, metadata that corresponds to the ambiguous determination by the officiator of the sporting event. For example, the control circuitry may analyze each stream and extract the appropriate metadata. The control circuitry may store the metadata in storage 508.

At 808, control circuitry 504 transmits a request for metadata entries, each describing content of a corresponding historical ambiguous event, where the request includes at least a portion of the metadata that corresponds to the ambiguous determination. For example, the control circuitry may transmit the request via communications network 614 to a database server that is remotely located. The database server may be associated with media content source 616 and/or media guidance data source 618.

At 810, control circuitry 504 receives, in response to the request, one or more historical ambiguous events that corresponds to the segment. For example, the control circuitry may receive metadata corresponding to the ambiguous historical events and store that metadata in storage 508 for further processing. At 812, control circuitry 504 generates for display (e.g., on a display 512) video of a historical ambiguous event of the one or more historical ambiguous events.

Figure 9:
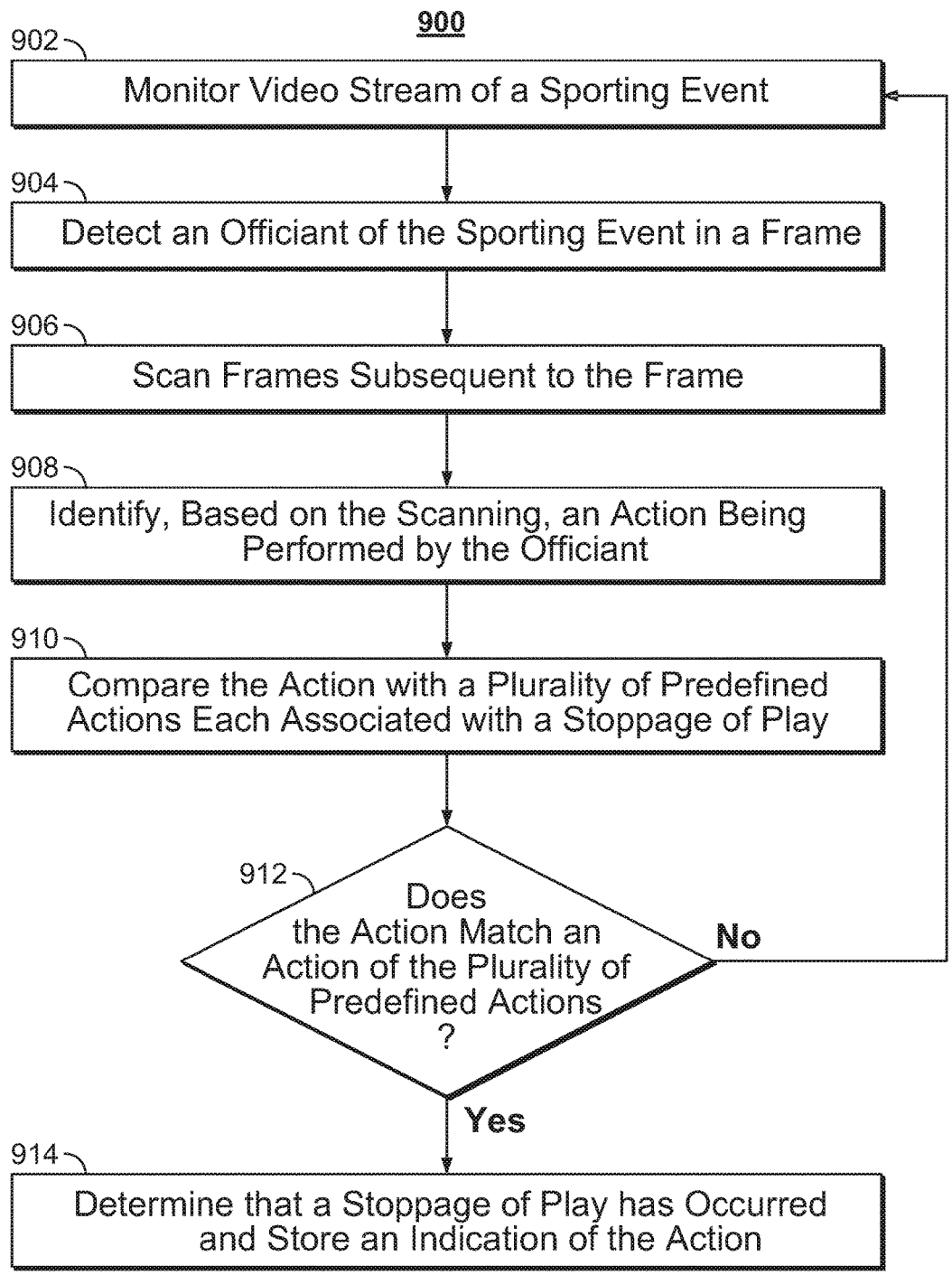
FIG. 9 is a flowchart of illustrative actions for determining whether a stoppage of play in a sporting event was caused by an officiator of that sporting event, in accordance with some embodiments of the disclosure.

FIG. 9 is a flowchart of illustrative actions for determining whether a stoppage of play in a sporting event was caused by an officiator of that sporting event. At 902, control circuitry 504 monitors the video stream of a sporting event. For example, the control circuitry may monitor storage 508 at a specific location for the frames of the sporting event as the frames are received by the device where the control circuitry resides. At 904, control circuitry 504 detects an officiator of the sporting event in a frame. For example, the control circuitry may execute an image analysis algorithm on each frame as the frames are received to identify the officiator in the frames.

At 906, control circuitry 504 scans frames subsequent to the frame where the officiator was detected. For example, the control circuitry may keep scanning the frames while the officiator is in the frames and stop scanning the frames when the officiator does not appear in a frame subsequent to a frame where the officiator does appear. The control circuitry may execute an image analysis algorithm on the consecutive frames where the officiator is shown. At 908, control circuitry 504 identifies, based on the scanning, an action being performed by the officiator. For example, the control circuitry may transmit the frames to a system that can analyze the frames and determine the movement that the officiator is performing and receive back keywords associated with the movement. The control circuitry may store those keywords in storage 508. At 910, control circuitry 504 compares the action with a plurality of predefined actions, each associated with a stoppage of play. For example, the control circuitry may retrieve the keywords from storage 508 and compare the keywords with stored (e.g., in storage 508) predefined actions. The predefined actions can be stored as keywords, images, and/or series of images. The predefined actions can be stored locally in storage 508 or at a remote server (e.g., a server associated with media content source 616 and/or media guidance data source 618).

At 912, control circuitry 504 determines whether the action matches an action of the plurality of predefined actions. If the action does not match any action of the plurality of predefined actions, process 900 moves to 902, where control circuitry 504 monitors the video stream of the sporting event. If the action matches any action of the plurality of predefined actions, process 900 moves to 914, where control circuitry 504 determines that a stoppage of play has occurred and stores an indication of the action. For example, the control circuitry may alert other processes on the device that the stoppage of play was caused by the officiator and store an indication (e.g., a code) for the type of stoppage of play. The type may be a specific penalty or decision that the referee has made. The control circuitry may store keywords, images, or clips (e.g., in storage 508).

Figure 10:
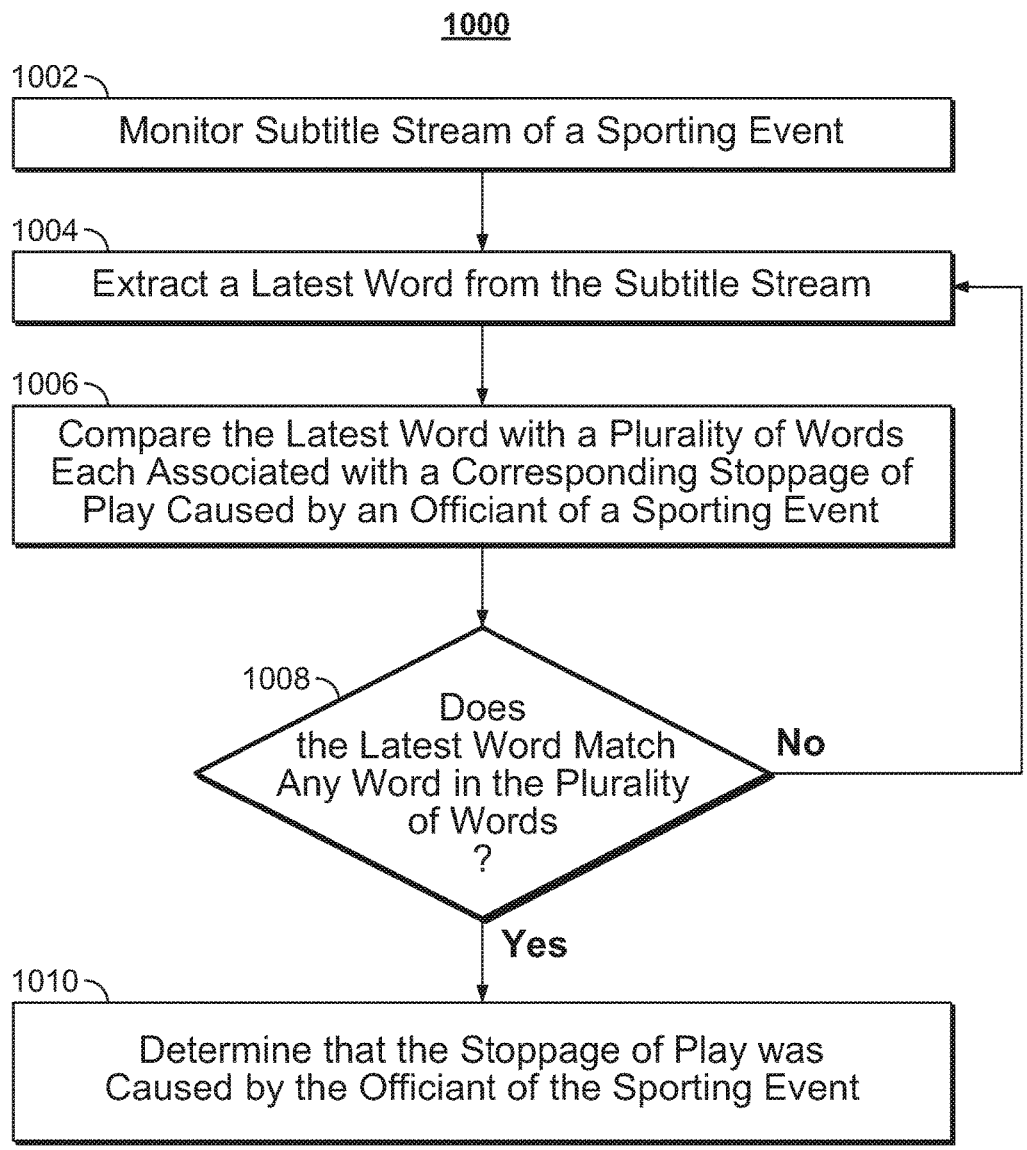
FIG. 10 is another flowchart of illustrative actions for determining whether a stoppage of play in a sporting event was caused by an officiator of that sporting event, in accordance with some embodiments of the disclosure.

FIG. 10 is another flowchart of illustrative actions for determining whether a stoppage of play in a sporting event was caused by an officiator of that sporting event. At 1002, control circuitry 504 monitors the subtitle stream of a sporting event. For example, the control circuitry may access the location (e.g., in storage 508) where the subtitle data is received. At 1004, control circuitry 504 extracts a latest, or most recent, word from the subtitle stream. For example, the control circuitry may iterate through each word received as part of the subtitle stream by extracting the word from the received stream (e.g., from storage 508). At 1006, control circuitry 504 compares the latest word with a plurality of words, each associated with a corresponding stoppage of play caused by an officiator of a sporting event. For example, control circuitry 504 may access a database of the plurality of words from storage 508 and compare each word with the extracted latest word. In some embodiments, the control circuitry may transmit each word to a remote server (e.g., a database server associated with media content source 616 and/or media guidance data source 618) and receive back a response as to whether the transmitted word matches a word in the database.

At 1008, control circuitry 504 determines whether the latest word matches any word in the plurality of words where each word is associated with a corresponding stoppage of play. If the latest word does not match any word in the plurality of words, process 1000 moves to 1002, where the control circuitry monitors the subtitle stream of the sporting event. If the latest word does match a word in the plurality of words, process 1000 moves to 1010, where control circuitry 504 determines that the stoppage of play was caused by the officiator of the sporting event. For example, the control circuitry may store the matching word together with data describing the stoppage of play.

Figure 11:
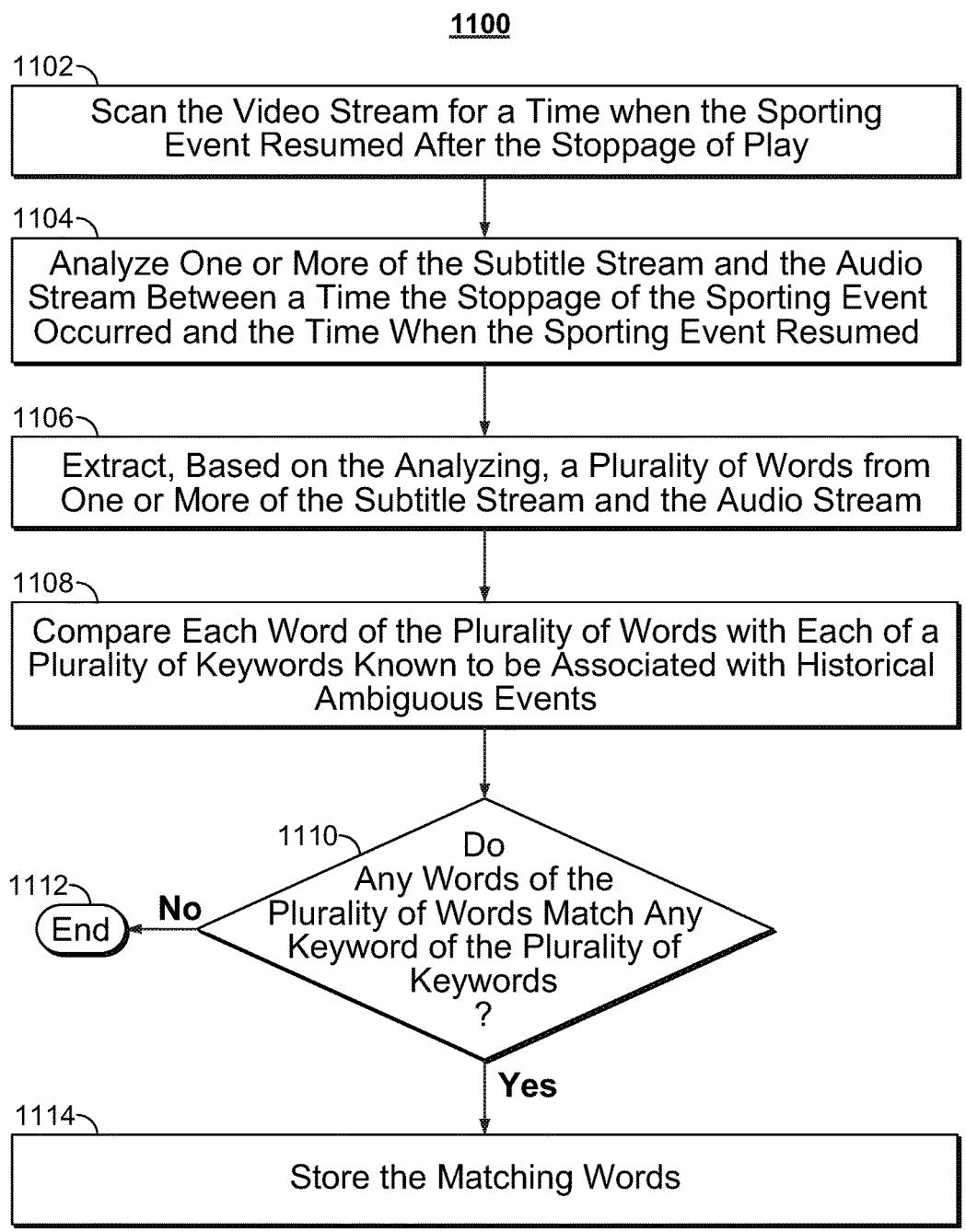
FIG. 11 is a flowchart of illustrative actions for extracting and storing keywords from the audio and subtitle streams that match keywords associated with historical ambiguous events, in accordance with some embodiments of the disclosure.

FIG. 11 is a flowchart of illustrative actions for extracting and storing keywords from the audio and subtitle streams that match keywords associated with historical ambiguous events. At 1102, control circuitry 504 scans the video stream for a time when the sporting event resumed after the stoppage of play. For example, the control circuitry may execute an image recognition algorithm to determine when game action has resumed. The control circuitry may analyze images (e.g., retrieved from a database) associated with a specific sport to determine what an image should look like of that sport when the action has resumed. The control circuitry may compare those images with images of the sporting event to determine a time of when the stoppage of play has ended.

At 1104, control circuitry 504 analyzes one or more of the subtitle stream and the audio stream between a time the stoppages of the sporting event occurred and the time when the sporting event resumed. For example, the control circuitry may access the subtitle stream and/or the audio stream data structures (e.g., in storage 508) to identify words within one or more of those streams. At 1106, control circuitry 504 extracts, based on the analyzing, a plurality of words from one or more of the subtitle stream and the audio stream. For example, the control circuitry may extract from the data structures (e.g., in storage 508) words one or more of the streams.

At 1108, control circuitry 504 compares each word of the plurality of words with each of a plurality of keywords known to be associated with historical ambiguous events. For example, the control circuitry may retrieve the keywords known to be associated with historical ambiguous events from a database (e.g., in storage 508). In some embodiments, the database may be located at a remote server (e.g., a server associated with media content source 616 and/or media guidance data source 618). The control circuitry may compare the retrieved keywords with each word of the plurality of words. It should be noted that the comparison may be performed between phrases. At 1108, control circuitry 504 determines whether any words of the plurality of words match any keyword of the plurality of keywords. If no retrieved keywords match any of the plurality of words, process 1100 goes to 1112 and ends (i.e., there are no matching historical events). If a retrieved keyword matches at least one of the plurality of words, process 1100 moves to 1114, where control circuitry 504 stores the matching words.

Figure 12:
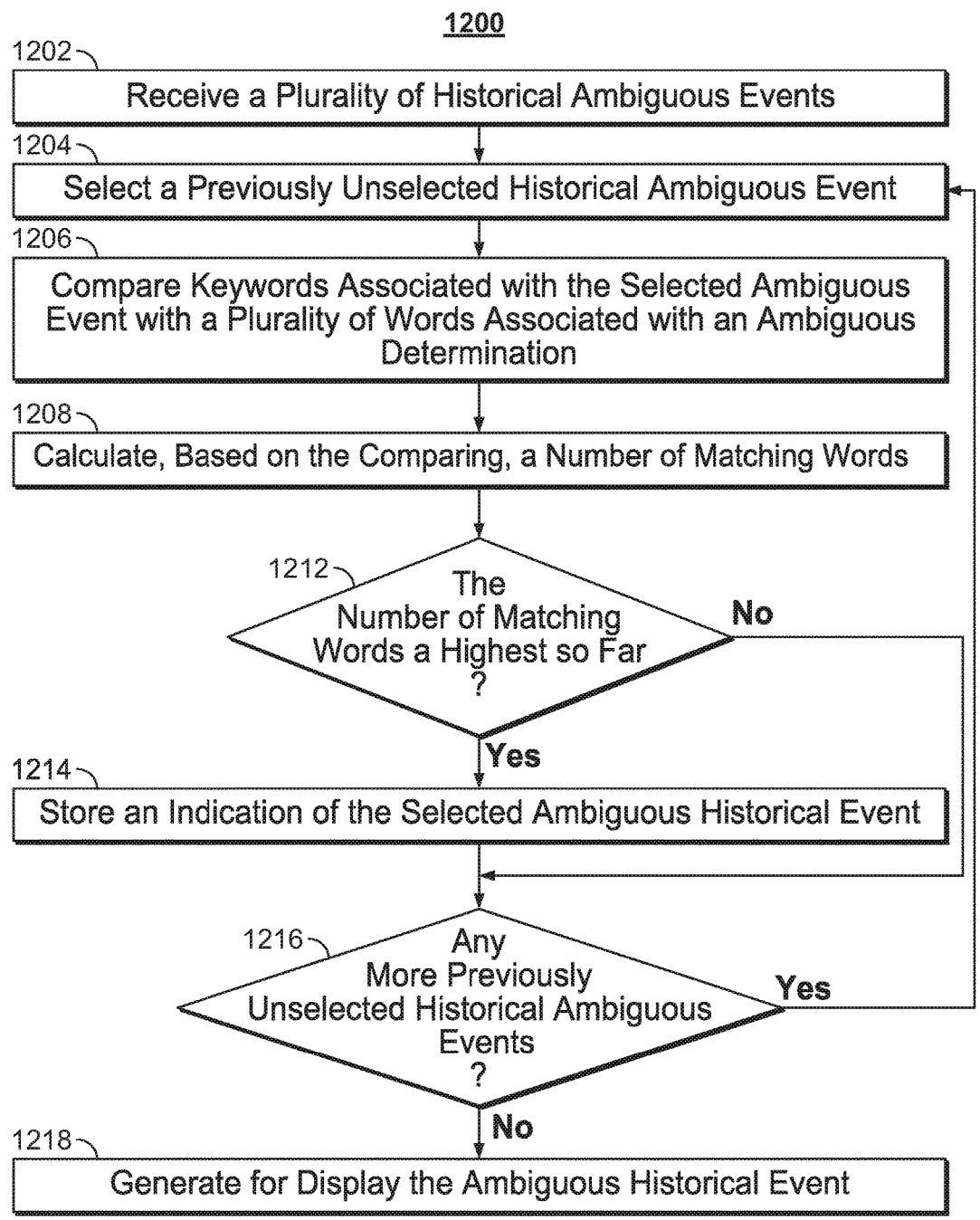
FIG. 12 is a flowchart of illustrative actions for selecting a historical ambiguous event to present to the user based on a number of keywords that match, in accordance with some embodiments of the disclosure.

FIG. 12 is a flowchart of illustrative actions for selecting a historical ambiguous event to present to the user based on a number of keywords that match. At 1202, control circuitry 504 receives a plurality of historical ambiguous events. For example, the control circuitry may receive metadata associated with the historical ambiguous events. The metadata may be received from a remote server (e.g., a server associated with media content source 616 and/or media guidance data source 618). The metadata may include a link to download the specific media. In some embodiments, the control circuitry may receive the videos themselves together with the metadata.

At 1204, control circuitry 504 selects a previously unselected historical ambiguous event. For example, the control circuitry may start iterating through each received historical ambiguous event of the plurality of ambiguous events. Each historical ambiguous event may be stored as metadata in a data structure that can be iterated through. The control circuitry may retrieve the metadata from each iterative portion of the data structure. At 1206, control circuitry 504 compares keywords associated with the selected ambiguous event with a plurality of words associated with an ambiguous determination. For example, the control circuitry may compare each word within the data structure for each historical ambiguous event with words associated with the ambiguous determination.

At 1208, control circuitry 504 calculates, based on the comparing, a number of matching words. At 1212, control circuitry 504 determines whether the number of matching words is the highest so far. For example, with every iteration the control circuitry may compare the number of matching words for the selected historical ambiguous event. The control circuitry may determine if the number of words that matches is higher than the number of words that previously matched. If the number of words that previously matched is higher, the associated historical ambiguous event is retained as the best matching one. If the number of words that previously matched is not higher, the associated ambiguous event is replaced with the current one. If the number of matching words is the highest so far, process 1200 moves to 1214, where control circuitry 504 stores an indication of the selected ambiguous historical event. If the number of matching words is not the highest so far, process 1200 moves to 1216 where control circuitry 504 determines whether there any more previously unselected historical ambiguous events. If there are more unselected historical ambiguous events, process 1200 moves to 1204 where the next previously unselected historical ambiguous event is selected. If there no more unselected historical ambiguous events, process 1200 moves to 1218 where control circuitry 504 generates for display the ambiguous historical event with the highest number of matching words.

Figure 13:
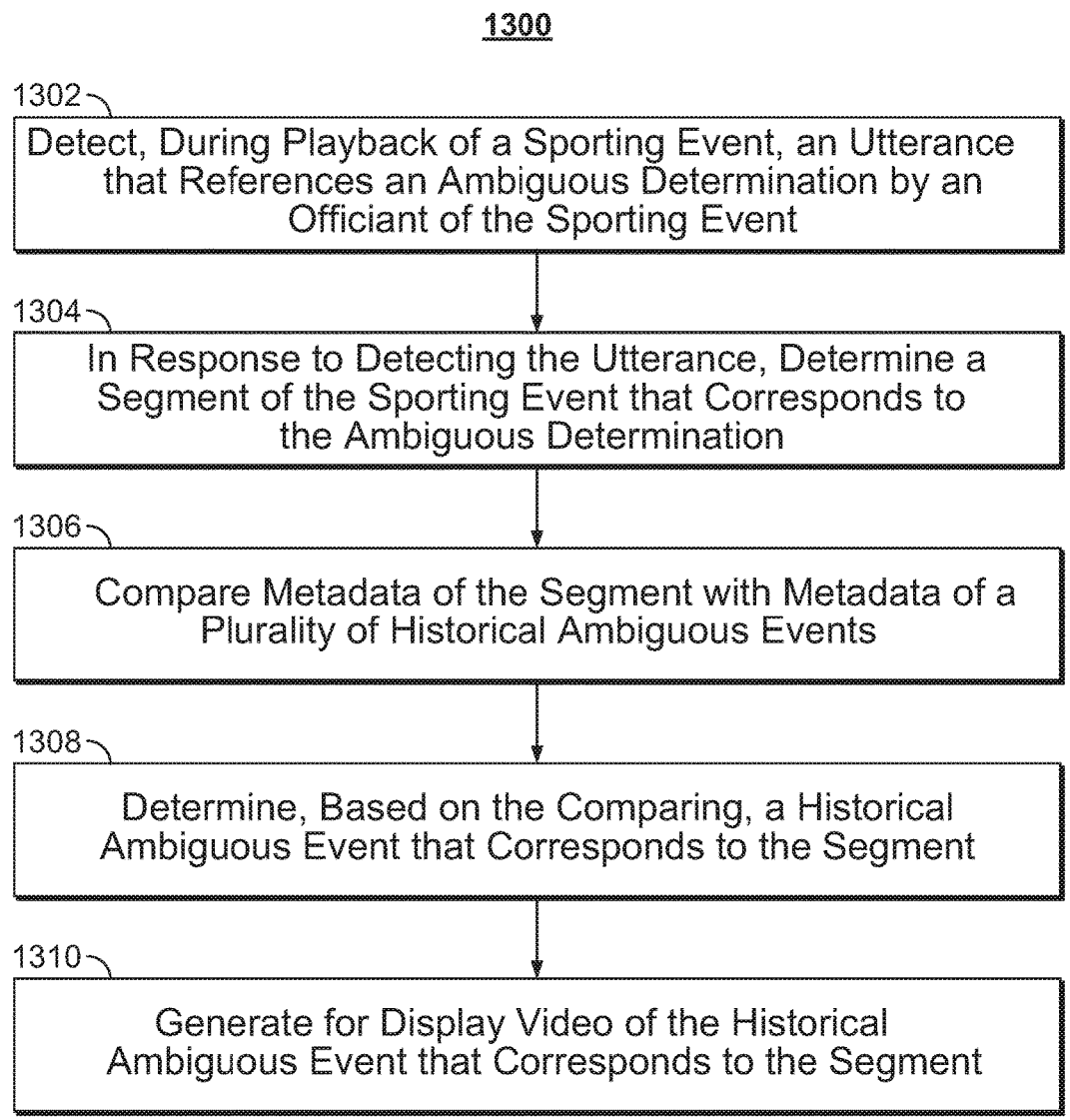
FIG. 13 is a flowchart of illustrative actions for providing similar media content based on user utterances responsive to ambiguous determinations at sporting events, in accordance with some embodiments of the disclosure.

FIG. 13 is a flowchart of illustrative actions for providing similar media content based on user utterances responsive to ambiguous determinations at sporting events. At 1302, control circuitry 504 detects, during playback of the sporting event, an utterance that references an ambiguous determination by an officiator of the sporting event. For example, the control circuitry may reside on a device that also includes a microphone. In some embodiments, the microphone may be part of user input interface 510 enabling voice input. At 1304, control circuitry 504, in response to detecting the utterance, determines a segment of the sporting event that corresponds to the ambiguous determination. For example, the control circuitry may store (e.g., in storage 508) the start time and the end time of the segment associated with the ambiguous determination.

At 1306, control circuitry 504 compares metadata of the segment to metadata of a plurality of historical ambiguous events. For example, the control circuitry may iterate through each historical ambiguous event and compare the metadata of the corresponding historical ambiguous event with metadata of the segment associated with the ambiguous determination. At 1308, control circuitry 504 determines, based on the comparing, a historical ambiguous event that corresponds to the segment. For example, the control circuitry may retrieve (e.g., from a server associated with media content source 616 and/or media guidance data source 618) the metadata associated with the historical ambiguous event and compare the retrieved metadata with the metadata associated with the ambiguous determination. In some embodiments, the control circuitry may transmit the metadata associated with the ambiguous determination to a remote server and the comparison may be performed on the remote server. At 1310, control circuitry 504 generates for display (e.g., on display 512) video of the historical ambiguous event that corresponds to the segment.

Figure 14:
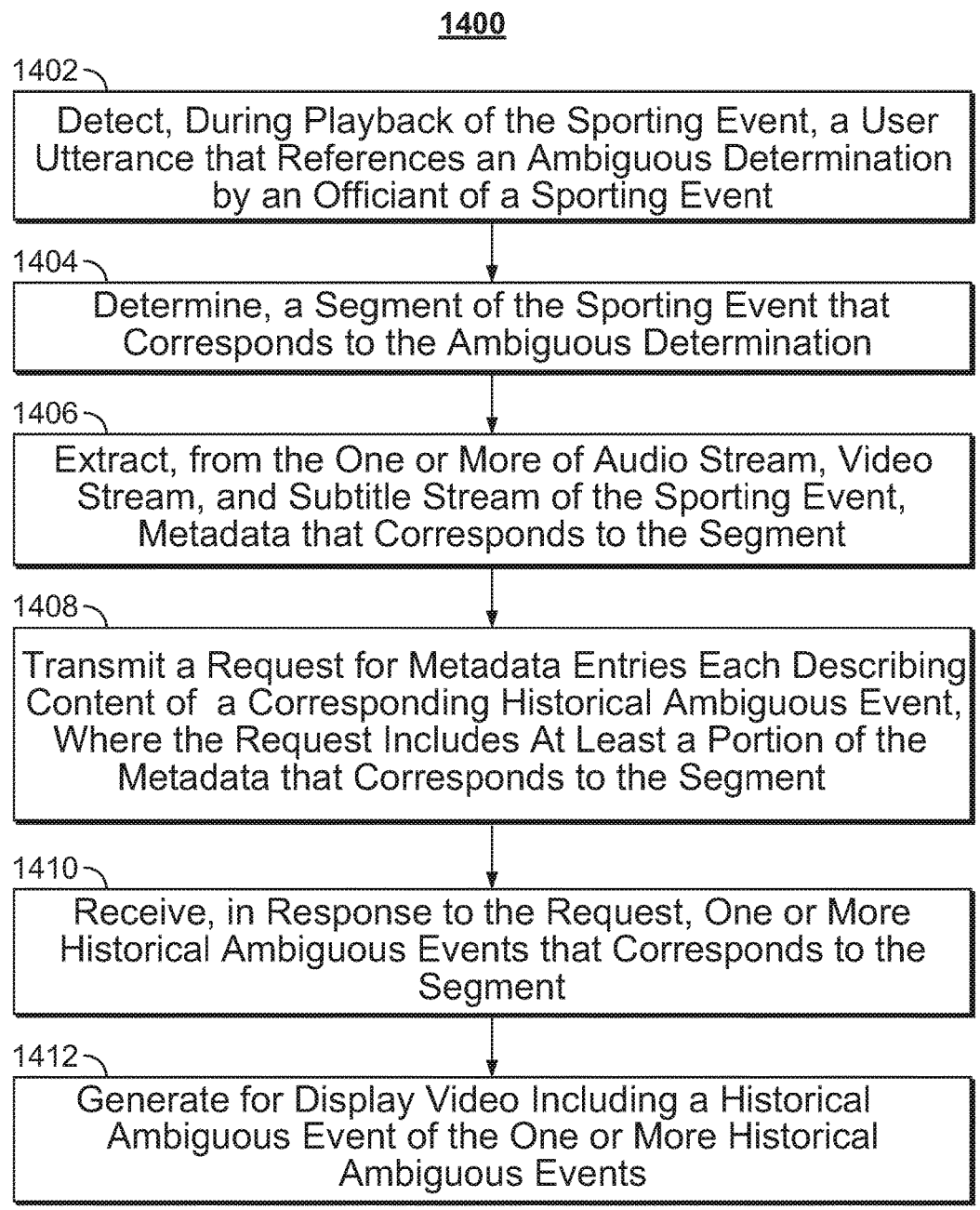
FIG. 14 is another flowchart of illustrative actions for providing similar media content based on user utterances responsive to ambiguous determinations at sporting events, in accordance with some embodiments of the disclosure.

FIG. 14 is another flowchart of illustrative actions for providing similar media content based on user utterances responsive to ambiguous determinations at sporting events. At 1402, control circuitry 504 detects, during playback of the sporting event, a user utterance that references an ambiguous determination by an officiator of a sporting event. For example, the control circuitry may reside on a device that also includes a microphone. In some embodiments, the microphone may be part of user input interface 510 enabling voice input. At 1404, control circuitry 504 determines a segment of the sporting event that corresponds to the ambiguous determination. For example, the control circuitry may store (e.g., in storage 508) the start time and the end time of the segment associated with the ambiguous determination.

At 1406, control circuitry 504 extracts, from the one or more of the audio stream, video stream, and subtitle stream of the sporting event, metadata that corresponds to the segment. For example, the control circuitry may access each of the streams in storage 508, in an appropriate location to extract the metadata. At 1408, control circuitry 504 transmits a request for metadata entries each describing content of a corresponding historical ambiguous event, where the request includes at least a portion of the metadata that corresponds to the segment. For example, the control circuitry may transmit the request via I/O path 502 onto a network 614. The request may be addressed (e.g., via TCP/IP) to a remote server (e.g., a server associated with media content source 616 and/or media guidance data source 618).

At 1410, control circuitry 504 receives, in response to the request, one or more historical ambiguous events that corresponds to the segment. For example, the control circuitry may receive the response from a remote server (e.g., a server associated with media content source 616 and/or media guidance data source 618) and store the response in storage 508. At 1412, control circuitry 504 generates for display (e.g., on display 512) video including a historical ambiguous event of the one or more historical ambiguous events.

Figure 15:
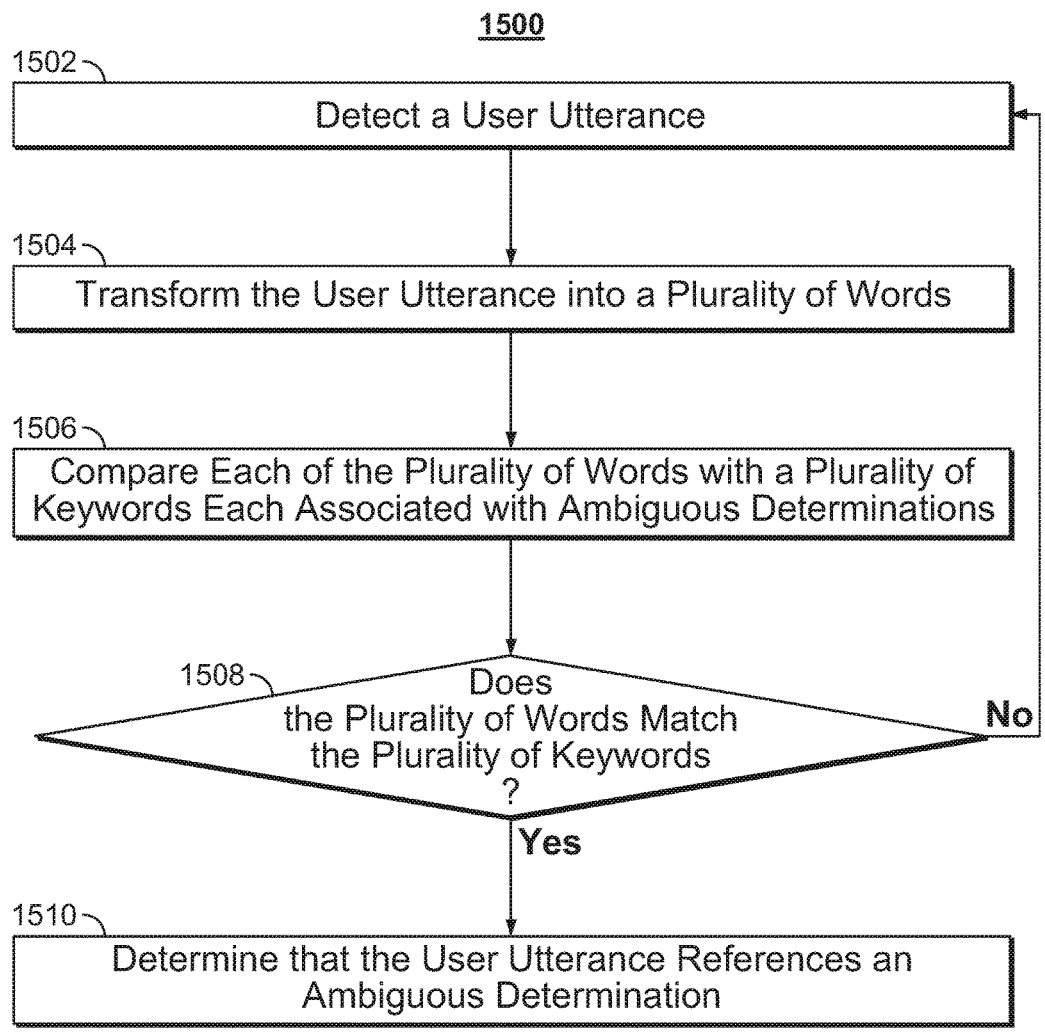
FIG. 15 is flowchart of illustrative actions for determining whether a detected user utterance references an ambiguous determination of a sporting event, in accordance with some embodiments of the disclosure.

FIG. 15 is flowchart of illustrative actions for determining whether a detected user utterance references an ambiguous determination of a sporting event. At 1502, control circuitry 504 detects a user utterance. For example, the control circuitry may reside on a device that includes a microphone. The control circuitry may use the microphone to detect the utterance. The microphone may be part of user input interface 510. At 1504, control circuitry 504 transforms the user utterance into a plurality of words. For example, the control circuitry may execute a voice recognition algorithm to extract the plurality of words. In some embodiments, the control circuitry may transmit the user utterance (e.g., in an audio format) to a remote server (e.g., a server associated with media content source 616 and or media guidance data source 618) and receive in response a textual representation of the words.

At 1506, control circuitry 504 compares each of the plurality of words with a plurality of keywords, each associated with ambiguous determinations. For example, the keywords known to be associated with ambiguous determinations may be stored (e.g., in storage 508 or at a remote server). The control circuitry may compare these keywords with keywords extracted from the user utterance. At 1508, control circuitry 504 determines whether the plurality of words matches the plurality of keywords. For example, the control circuitry may determine a match when at least one word matches with one word. In some embodiments, the control circuitry may determine a match when a certain percentage of words match. If the plurality of words does not match the plurality of keywords, process 1500 moves to 1502 where another utterance is detected. If the plurality of words matches the plurality of keywords, process 1500 moves to 1510 where control circuitry 504 determines that the user utterance references an ambiguous determination. For example, the control circuitry may store the determination in storage 508 and/or transmit an indication of the determination to a remote server or a user device.

The processes discussed above are intended to be illustrative and not limiting. One skilled in the art would appreciate that the actions of the processes discussed herein may be omitted, modified, combined, and/or rearranged, and any additional actions may be performed without departing from the scope of the invention. More generally, the above disclosure is meant to be exemplary and not limiting. Only the claims that follow are meant to set bounds as to what the present disclosure includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method for providing similar media content during stoppage of play when an ambiguous determination occurs at sporting events, the method comprising:
    determining, during playback of a sporting event that a stoppage of play has occurred, based on:
        comparing one or more of a movement and position of the officiator of the sporting event with a plurality of database entries each including one or more of a pre-determined movement and position of the officiator; and
        determining, based on the comparing, that the officiator of the sporting event is performing a pre-defined action; and
        in response to determining that the officiator of the sporting event is performing the pre-defined action, determining that the stoppage of play has occurred;
    in response to determining that the stoppage of play has occurred:
    accessing one or more of an audio stream of the sporting, event, a video stream of the sporting event, and a subtitle stream of the sporting event;
    determining, based on one or more of the video stream, the audio stream, and the subtitle stream, whether the stoppage of play resulted from an ambiguous determination by an officiator of the sporting event;
    in response to determining that the stoppage of play resulted from the ambiguous determination, extracting, from the one or more of audio stream, video stream, and subtitle stream of the sporting event, metadata that corresponds to the ambiguous determination by the officiator of the sporting event;
    transmitting a request for metadata entries each describing content of a corresponding historical ambiguous event, wherein the request includes at least a portion of the metadata that corresponds to the ambiguous determination;
    receiving, in response to the request, one or more historical ambiguous events that corresponds to the segment; and
    generating for display video comprising a historical ambiguous event of the one or more historical ambiguous events.

2. The method of claim 1, wherein determining, whether the stoppage of play resulted from the ambiguous determination by the officiator of the sporting event comprises:
    monitoring one or more of the subtitle stream of the sporting event and the audio stream of the sporting event;
    comparing a plurality of words within the one or more of the subtitle stream of the sporting event and the audio stream of the sporting event with keywords associated with an ambiguous determination; and
    determining, based on comparing the plurality of words within the one or more of the subtitle stream of the sporting event and the audio stream of the sporting event with the keywords associated with the ambiguous determination, that the ambiguous determination by the officiator of the sporting event has occurred.

3. The method of claim 1, wherein extracting metadata that corresponds to the ambiguous determination by the officiator of the sporting event comprises:
    analyzing, following the stoppage of play, one or more of the subtitle stream and the audio stream; and
    extracting, based on the analyzing from the one or more of the subtitle stream and the audio stream, one or more keywords associated with the ambiguous determination.

4. The method of claim 3, wherein analyzing one or more of the subtitle stream and the audio stream following the stoppage of play comprises:
    scanning the video stream for a time when the sporting event resumed after the stoppage of play; and
    analyzing the one or more of the subtitle stream and the audio stream between a time the stoppage of the sporting event occurred and the time when the sporting event resumed.

5. The method of claim 4, wherein extracting the one or more keywords associated with the ambiguous determination comprises:
    extracting, from one or more of the audio stream and subtitle stream, a plurality of words detected following the stoppage of play;
    comparing each word of the plurality of words with each of a plurality of keywords known to be associated with ambiguous determinations; and
    storing those words of the plurality of words that match one or more of the plurality of keywords known to be associated with the ambiguous determinations.

6. The method of claim 1, further comprising:
    determining that a plurality of historical ambiguous events was received in response to the request; and
    selecting the historical ambiguous event of the plurality of ambiguous events based on a number of an amount of extracted keywords matching a number of keywords associated with the historical ambiguous event.

7. The method of claim 1, further comprising:
generating for display one or more indications for the one or more historical ambiguous events; and
in response to a user selection of an indication of the one or more indications, generating for simultaneous display a historical ambiguous event corresponding to the selected indication and a media segment associated with the ambiguous determination.

8. A system for providing similar media content during stoppage of play when an ambiguous determination occurs at sporting events, the system comprising:
control circuitry configured to:
determine, during playback of a sporting event that a stoppage of play has occurred, based on:
comparing one or more of a movement and position of the officiator of the sporting event with a plurality of database entries each including one or more of a pre-determined movement and position of the officiator; and
determining, based on the comparing, that the officiator of the sporting event is performing a pre-defined action; and
in response to determining that the officiator of the sporting event is performing the pre-defined action, determining that the stoppage of play has occurred;
in response to determining that the stoppage of play has occurred:
access one or more of an audio stream of the sporting, event, a video stream of the sporting event, and a subtitle stream of the sporting event;
determine, based on one or more of the video stream, the audio stream, and the subtitle stream, whether the stoppage of play resulted from an ambiguous determination by an officiator of the sporting event;
in response to determining that the stoppage of play resulted from the ambiguous determination, extract, from the one or more of audio stream, video stream, and subtitle stream of the sporting event, metadata that corresponds to the ambiguous determination by the officiator of the sporting event;
transmit a request for metadata entries each describing content of a corresponding historical ambiguous event, wherein the request includes at least a portion of the metadata that corresponds to the ambiguous determination;
receive, in response to the request, one or more historical ambiguous events that corresponds to the segment; and
generate for display video comprising a historical ambiguous event of the one or more historical ambiguous events.

9. The system of claim 8, wherein the control circuitry is further configured, when determining, whether the stoppage of play resulted from the ambiguous determination by the officiator of the sporting event, to:
monitor one or more of the subtitle stream of the sporting event and the audio stream of the sporting event;
compare a plurality of words within the one or more of the subtitle stream of the sporting event and the audio stream of the sporting event with keywords associated with an ambiguous determination; and
determine, based on comparing the plurality of words within the one or more of the subtitle stream of the sporting event and the audio stream of the sporting event with the keywords associated with the ambiguous determination, that the ambiguous determination by the officiator of the sporting event has occurred.

10. The system of claim 8, wherein the control circuitry is configured, when extracting metadata that corresponds to the ambiguous determination by the officiator of the sporting event, to:
analyze, following the stoppage of play, one or more of the subtitle stream and the audio stream; and
extract, based on the analyzing from the one or more of the subtitle stream and the audio stream, one or more keywords associated with the ambiguous determination.

11. The system of claim 10, wherein the control circuitry is configured, when analyzing one or more of the subtitle stream and the audio stream following the stoppage of play, to:
scan the video stream for a time when the sporting event resumed after the stoppage of play; and
analyze the one or more of the subtitle stream and the audio stream between a time the stoppage of the sporting event occurred and the time when the sporting event resumed.

12. The system of claim 11, wherein the control circuitry is further configured, when extracting the one or more keywords associated with the ambiguous determination to:
extract, from one or more of the audio stream and subtitle stream, a plurality of words detected following the stoppage of play;
compare each word of the plurality of words with each of a plurality of keywords known to be associated with ambiguous determinations; and
store those words of the plurality of words that match one or more of the plurality of keywords known to be associated with the ambiguous determinations.

13. The system of claim 8, wherein the control circuitry is further configured to:
determine that a plurality of historical ambiguous events was received in response to the request; and
select the historical ambiguous event of the plurality of ambiguous events based on a number of an amount of extracted keywords matching a number of keywords associated with the historical ambiguous event.

14. The system of claim 8, wherein the control circuitry is further configured to:
generate for display one or more indications for the one or more historical ambiguous events; and
in response to a user selection of an indication of the one or more indications, generate for simultaneous display a historical ambiguous event corresponding to the selected indication and a media segment associated with the ambiguous determination.

* * * * *